(12) United States Patent
Park et al.

(10) Patent No.: US 11,516,801 B2
(45) Date of Patent: Nov. 29, 2022

(54) METHOD AND APPARATUS FOR SHARING FREQUENCY RESOURCES BETWEEN MOBILE COMMUNICATION PROVIDERS IN WIRELESS COMMUNICATION SYSTEM

(71) Applicant: Samsung Electronics Co., Ltd., Suwon-si (KR)

(72) Inventors: Seungil Park, Suwon-si (KR); Youngjoon Kim, Suwon-si (KR); Hyojin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 16/992,639

(22) Filed: Aug. 13, 2020

(65) Prior Publication Data

US 2021/0051658 A1 Feb. 18, 2021

(30) Foreign Application Priority Data

Aug. 16, 2019 (KR) ........................ 10-2019-0100528

(51) Int. Cl.
*H04W 72/04* (2009.01)
*H04L 1/18* (2006.01)
*H04W 56/00* (2009.01)

(52) U.S. Cl.
CPC ....... *H04W 72/0453* (2013.01); *H04L 1/1812* (2013.01); *H04W 56/001* (2013.01)

(58) Field of Classification Search
None
See application file for complete search history.

(56) References Cited

U.S. PATENT DOCUMENTS 10,285,045 B2 5/2019 Prakash et al.
10,299,124 B2 5/2019 Kweon et al.
(Continued)

FOREIGN PATENT DOCUMENTS

EP 3 065 482 A1 9/2016
KR 10-2010-0084483 A 7/2010
(Continued)

OTHER PUBLICATIONS

International Search Report dated Nov. 25, 2020, issued in International Application No. PCT/KR2020/010815.
(Continued)

*Primary Examiner* — Saba Tsegaye
(74) *Attorney, Agent, or Firm* — Jefferson IP Law, LLP

(57) ABSTRACT

The disclosure relates to a communication method and system for converging a 5th-Generation (5G) communication system or a 6th-Generation (6G) communication system for supporting higher data rates beyond a 4th-Generation (4G) system. A method of communicating with a user equipment by using a frequency resource of a second mobile communication provider in a mobile communication system, the method being performed by a first base station of a first mobile communication provider is provided. The method includes requesting to permit the first base station to use a second frequency resource of the second mobile communication provider, transmitting, to the user equipment, setting information, for establishing communication using the second frequency resource of the second mobile communication provider, through a first frequency resource of the first mobile communication provider, and communicating with the user equipment through the second frequency resource, based on the setting information.

18 Claims, 25 Drawing Sheets

(56) References Cited

U.S. PATENT DOCUMENTS

| | | |
|---|---|---|
| 10,666,484 B2 | 5/2020 | Zhang et al. |
| 2011/0280176 A1 | 11/2011 | Lee et al. |
| 2015/0043451 A1* | 2/2015 | Goto ................. H04W 72/0453 370/329 |
| 2016/0094999 A1* | 3/2016 | Yu ........................ H04L 5/0096 455/454 |
| 2016/0142994 A1 | 5/2016 | Luo et al. |
| 2016/0157103 A1 | 6/2016 | Teng et al. |
| 2017/0013465 A1 | 1/2017 | Luo et al. |
| 2017/0163392 A1* | 6/2017 | Lim .................... H04W 72/082 |
| 2017/0215084 A1 | 7/2017 | Futaki et al. |
| 2018/0115906 A1 | 4/2018 | Damnjanovic et al. |
| 2019/0268867 A1 | 8/2019 | Luo et al. |
| 2019/0335466 A1* | 10/2019 | Iinuma ...................... H04L 5/14 |

FOREIGN PATENT DOCUMENTS

| | | |
|---|---|---|
| KR | 10-2016-0128125 A | 11/2016 |
| KR | 10-1751472 B1 | 6/2017 |
| KR | 10-2017-0084089 A | 7/2017 |
| KR | 10-2018-0063115 A | 6/2018 |
| KR | 10-1879457 B1 | 7/2018 |
| WO | 2014/070065 A1 | 5/2014 |

OTHER PUBLICATIONS

Extended European Search Report dated Apr. 4, 2022, issued in a counterpart European Application No. 20854133.4.

\* cited by examiner

FIG. 14
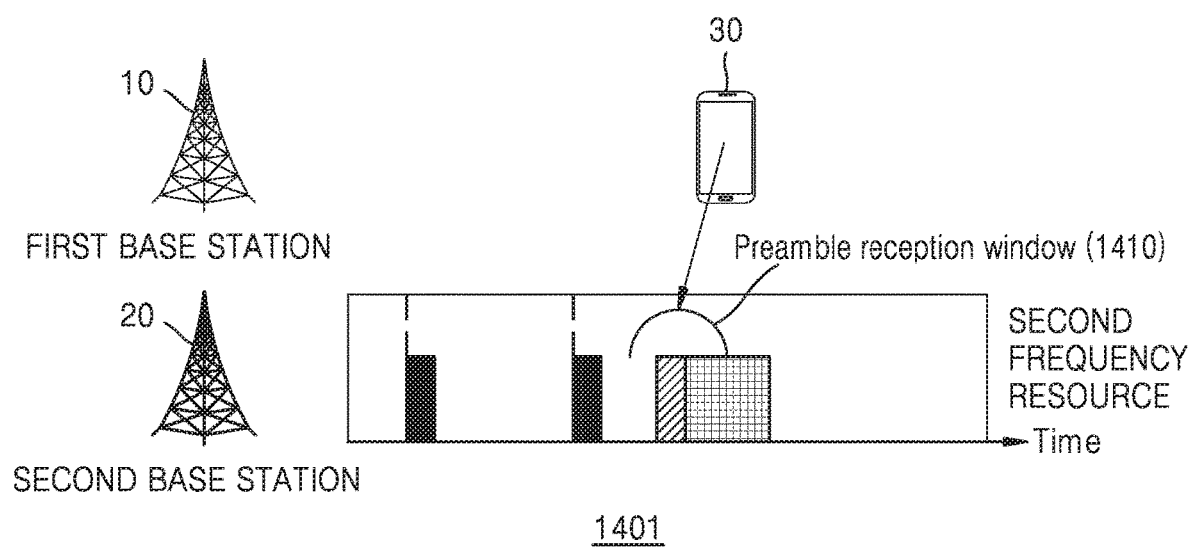
1401
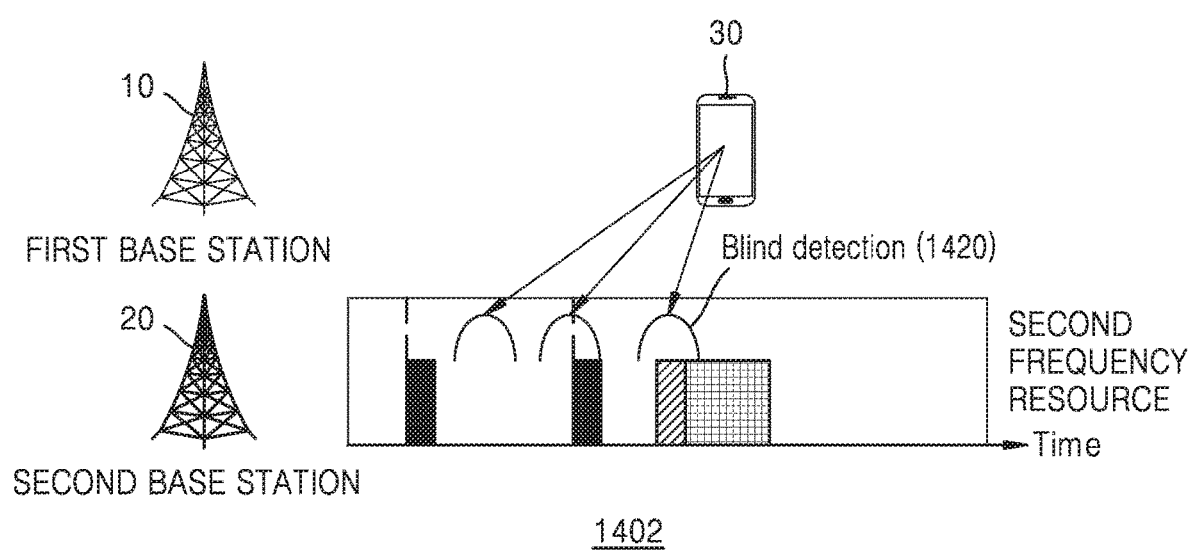
1402

METHOD AND APPARATUS FOR SHARING FREQUENCY RESOURCES BETWEEN MOBILE COMMUNICATION PROVIDERS IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0100528, filed on Aug. 16, 2019, in the Korean Intellectual Property Office, the disclosure of which is incorporated by reference herein in its entirety.

BACKGROUND

1. Field

The disclosure relates to a communication method and system for converging a 5th-Generation (5G) communication system or a 6th-Generation (6G) communication system for supporting higher data rates beyond a 4th-Generation (4G) system.

The disclosure relates to a method and an apparatus for a mobile communication provider to communicate with a user equipment by sharing a frequency resource of another mobile communication provider in a wireless communication system.

2. Description of Related Art

Considering the development of mobile communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as Beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than orthogonal frequency division multiplexing (OFDM), beamforming and massive multi-input multi-output (MIMO), full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink (user equipment (UE) transmission) and a downlink (node B transmission) to simultaneously use the same frequency resource at the same time; a network technology for utilizing satellites, high-altitude platform stations (HAPS), and the like in an integrated manner; an improved network structure for supporting mobile nodes B and the like and enabling network operation optimization and automation and the like; an use of AI in wireless communication for improvement of overall network operation by considering AI from the initial phase of developing technologies for 6G and internalizing end-to-end AI support functions; and a next-generation distributed computing technology for overcoming the limit of UE computing ability through reachable super-high-performance communication and computing resources (MEC, clouds, and the like) over the network.

It is expected that such research and development of 6G communication systems will bring the next hyper-connected experience to every corner of life. Particularly, it is expected that services such as truly immersive XR, high-fidelity mobile hologram, and digital replica could be provided through 6G communication systems.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of communicating with a user equipment (UE) by using a frequency resource of a second mobile communication provider in a wireless communication system, the method being performed by a first base station of a first mobile communication provider.

Another aspect of the disclosure is to provide a method of identifying a mobile communication provider through identification information of the mobile communication provider, which is included in synchronization information of a base station.

Another aspect of the disclosure is to provide a method of obtaining synchronization information of a first mobile communication provider from a second frequency resource of a second mobile communication provider, the method being performed by a UE.

Additional aspects will be set forth in part in the description which follows and, in part, will be apparent from the description, or may be learned by practice of the presented embodiments.

In accordance with an embodiment of the disclosure, a method of communicating with a user equipment through a frequency resource of a second mobile communication provider in a mobile communication system is provided. The method being performed by a first base station of a first mobile communication provider includes requesting to permit the first base station to use a second frequency resource of the second mobile communication provider, transmitting, to the user equipment, setting information, for establishing communication using the second frequency resource of the second mobile communication provider, through a first frequency resource of the first mobile communication provider, and communicating with the user equipment through the second frequency resource, based on the setting information.

In an embodiment of the disclosure, the method may further include receiving a response to the request for the permission, and the transmitting of the setting information may include transmitting the setting information, based on the received response.

In an embodiment of the disclosure, the method may further include determining that the request is permitted unless a negative acknowledgment (NACK) is received with respect to the request for the permission.

In an embodiment of the disclosure, the setting information may include information about a method of obtaining, by the user equipment, synchronization information corresponding to the first base station, and the synchronization information may be obtained through at least one of a periodic synchronization signal or an aperiodic preamble and include identification information of the first mobile communication provider.

In an embodiment of the disclosure, the identification information may be uniquely predetermined for the first mobile communication provider to distinguish between a plurality of mobile communication providers or is allocated to the first base station from a second base station of the second mobile communication provider, and the method may further include transmitting the identification information of the first mobile communication provider to the user equipment.

In an embodiment of the disclosure, the method may further include requesting a second base station of the second mobile communication provider to allocate time and frequency resources to the first base station for communication with the user equipment by using the second frequency resource, receiving allocation of the time and frequency resources from the second base station, and transmitting the periodic synchronization signal or the aperiodic preamble to the user equipment by using the allocated time and frequency resources. The communicating with the user equipment may include communicating with the user equipment, based on the synchronization information included in the periodic synchronization signal or the aperiodic preamble.

In an embodiment of the disclosure, the setting information may include information about a method of obtaining, by the user equipment, synchronization information corresponding to the first base station, and the synchronization information may be obtained based on a first synchronization signal transmitted through the first frequency resource or a second synchronization signal transmitted through the second frequency resource, wherein the first synchronization signal corresponds to the first base station and the second base station corresponds to the second base station of the second mobile communication provider.

In an embodiment of the disclosure, the information about the method of obtaining the synchronization information may include information about an offset between the first or second synchronization signal and the synchronization information for communicating the user equipment with the first base station through the second frequency resource.

In an embodiment of the disclosure, the method may further include obtaining information about a second synchronization signal corresponding to a second base station of the second mobile communication provider, determining a region in which rate matching is to be performed when the user equipment receives data from the first base station, based on the information about the second synchronization signal, and transmitting, to the user equipment, information about the region in which rate matching is to be performed, and the information about the second synchronization signal may include information about transmission timing of the second synchronization signal and information about a transmission period of the second synchronization signal.

In an embodiment of the disclosure, the method may further include receiving a request to permit use of the first frequency resource of the first mobile communication provider from a third base station of a third mobile communication provider, and determining whether to permit the third base station to use the first frequency resource, based on the request from the third base station.

According to another embodiment of the disclosure, there is provided a method of communicating with a first base station of a first mobile communication provider by using a frequency resource of a second mobile communication provider in a wireless communication system, the method being performed by a user equipment and including receiving setting information, for establishing communication using a second frequency resource of the second mobile communication provider, through a first frequency resource of the first mobile communication provider, obtaining synchronization information corresponding to the first base station, based on the received setting information, and communicating with the first base station through the second frequency resource, based on the obtained synchronization information, wherein the setting information includes information about a method of obtaining the synchronization information, and the synchronization information includes identification information of the first mobile communication provider.

In accordance with another aspect of the disclosure, a first base station of a first mobile communication provider, which communicates with a user equipment by using a frequency resource of a second mobile communication provider in a wireless communication is provided. The first base station includes a transceiver, a memory, and at least one processor configured to control to request to permit the first base station to use a second frequency resource of the second mobile communication provider, transmit setting information, for establishing communication through the second frequency resource of the second mobile communication provider, to the user equipment by using a first frequency resource of the first mobile communication provider, and communicate with the user equipment through the second frequency resource, based on the setting information.

In accordance with another aspect of the disclosure, a user equipment for communicating with a first base station of a first mobile communication provider by using a frequency resource of a second mobile communication provider in a wireless communication system is provided. The UE includes a transceiver, a memory, and at least one processor configured to control to receive setting information, for establishing communication using the second frequency resource of the second mobile communication provider, through a first frequency resource of the first mobile communication provider, obtain synchronization information corresponding to the first base station, based on the received setting information, and communicate with the first base station through the second frequency resource, based on the obtained synchronization information, wherein the setting information includes information about a method of obtaining the synchronization information, and the synchronization information includes identification information of the first mobile communication provider.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 14 is a diagram illustrating a method of instructing a resource region to be monitored by a UE to receive a synchronization signal, the method being performed by a first base station according to an embodiment of the disclosure;

Throughout the drawings, it should be noted that like reference numbers are used to depict the same or similar elements, features, and structures.

DETAILED DESCRIPTION

Figure 1:
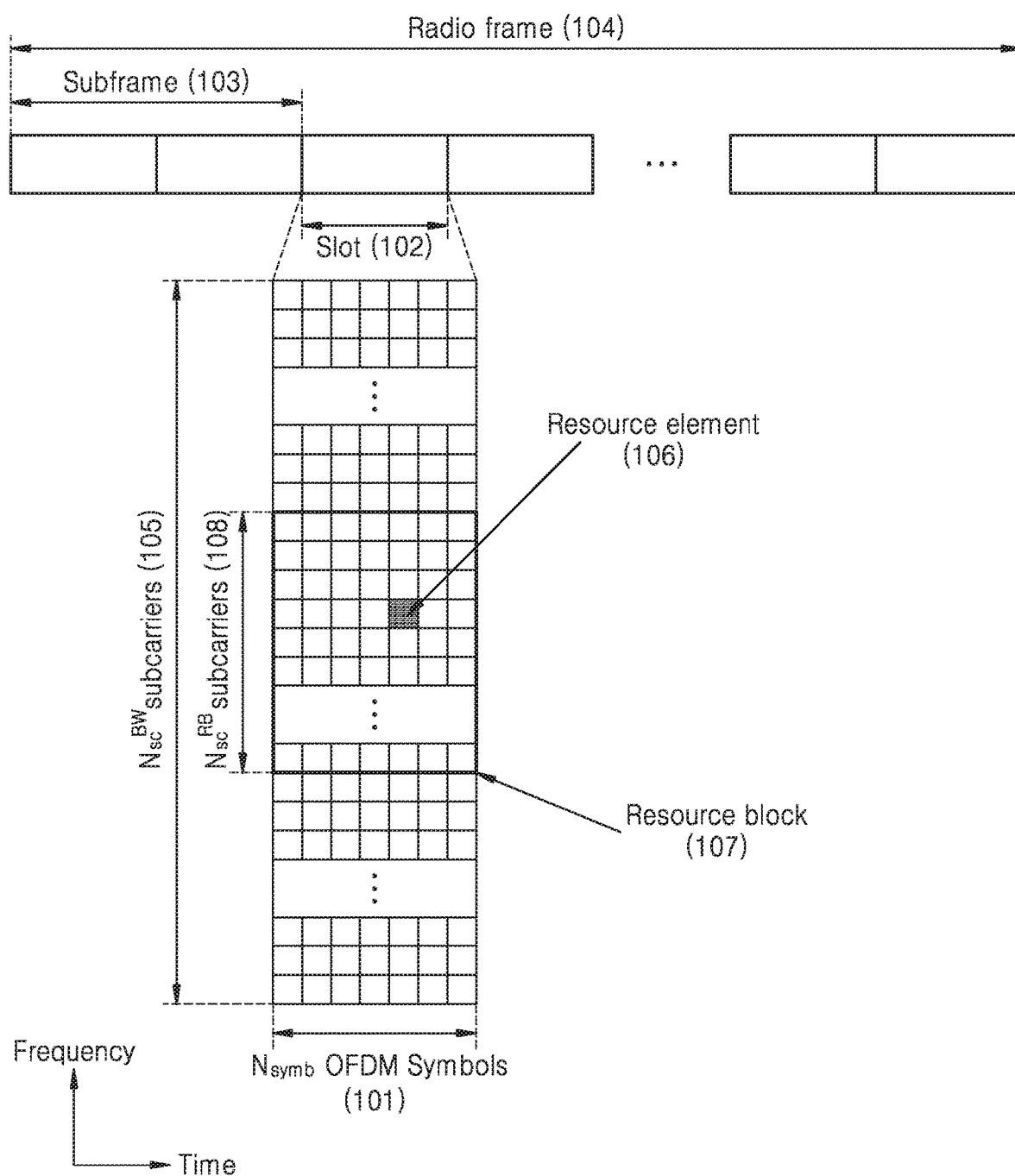
FIG. 1 is a diagram illustrating a basic structure of a time-frequency domain of a long-term evolution (LTE) system, which is a radio resource domain in which data or control information is transmitted according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When embodiments of the disclosure are described herein, a description of techniques which are well known in the technical field to which the disclosure pertains and are not directly related to the disclosure will be omitted. This is to more clearly convey the gist of the disclosure by omitting unnecessary description.

For the same reason, some components are exaggerated, omitted, or schematically illustrated in the accompanying drawings. The size of each component does not entirely reflect the actual size thereof. The same reference numbers are assigned to the same or corresponding elements in each drawing.

Advantages and features of the disclosure and methods of achieving them will be apparent from embodiments of the disclosure described below, in conjunction with the accompanying drawings. However, the disclosure is not limited to the embodiments thereof below and may be embodied in many different forms. Rather, these embodiments are provided so that this disclosure will be thorough and complete and will fully convey the concept of the disclosure to those of ordinary skill in the art. The disclosure should be defined by the scope of the claims. The same reference numerals refer to the same components throughout the specification.

In this case, it will be understood that each block of process flowcharts and combinations of the flowcharts may be performed by computer program instructions. The computer program instructions may be installed in a processor of a general-purpose computer, special-purpose computer, or other programmable data processing equipment, so that means to perform functions described in blocks of each flowchart may be produced by instructions executed by the processor of the computer or the other programmable data processing equipment. The computer program instructions may be stored in a computer usable or readable memory oriented to a computer or other programmable data processing equipment to implement functions in a particular way. Thus, an article of manufacture, including an instruction means for performing the function described in a block (or blocks) of each flowchart, may be produced by the instructions stored in the computer usable or readable memory. Because the computer program instructions may be stored in a computer or other programmable data processing equipment, the functions of the blocks of each flowchart may be provided by the instructions performing a series of operations in the computer or the other programmable data processing equipment to produce a process executable by the computer to generate a computer programmable instructions to operate the computer or the other data processing equipment.

In addition, each block may represent a module, segment, or part of code that includes one or more executable instructions for executing specified logical function(s). It should be noted that in some alternative embodiments, the functions described in the blocks may be performed in an order different from that described herein. For example, two blocks illustrated consecutively may be performed substantially simultaneously or performed in a reverse order according to functions corresponding thereto in some cases.

In this case, the term "unit" used in embodiments set forth herein refers to a software or a hardware component, such as a field programmable gate array (FPGA) or an application-specific integrated circuit (ASIC), which performs certain functions. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Components and functions provided in "units" may be combined to a smaller number of components and "units" or may be divided into sub-components and "sub-units". In addition, the components and "units" may be implemented to execute one or more CPUs in a device or a secure multimedia card. In embodiments of the disclosure, a "unit" may include one or more processors.

As used herein, terms used to identify a connection node, terms referring to network entities, terms referring to messages, a term referring to interface between network entities, terms referring to various types of identification information, and the like are examples provided for convenience of explanation. Accordingly, the disclosure is not limited to terms described below and other terms indicating objects having equivalent technical meanings may be used.

Hereinafter, the term "base station" may refer to a subject that allocates a resource to a terminal, and may be at least one of a gNode B, an eNode B, a Node B, a base station (BS), a radio access unit, a base station controller, or a node in a network. Examples of a terminal may include a user equipment (UE), a mobile station (MS), a cellular phone, a smart phone, a computer, or a multimedia system capable of performing a communication function. In addition, the term "terminal" may refer to other wireless communication devices, as well as cellular phones, NB-IoT devices, and sensors. The terms "base station" and "terminal" are not limited to the above examples.

For convenience of description, terms and names defined in 3rd Generation Partnership Project (3GPP) Long-Term Evolution (LTE) and/or 3GPP New Radio (NR) will be used in the disclosure below. However, the disclosure is not limited by these terms and names and is equally applicable to systems conforming to other standards.

Throughout the disclosure, the expression "at least one of a, b or c" indicates only a, only b, only c, both a and b, both a and c, both b and c, all of a, b, and c, or variations thereof.

Examples of a terminal may include a UE, a mobile station (MS), a cellular phone, a smartphone, a computer, a multimedia system capable of performing a communication function, and the like.

In the disclosure, a controller may also be referred to as a processor.

In the disclosure, a layer (or a layer apparatus) may also be referred to as an entity.

A future communication system after LTE, that is, a 5G or 6G communication system should be capable of freely reflecting various requirements from users, service providers, and the like and thus should support services satisfying various requirements at the same time. Examples of services that may be considered for 5G or 6G communication systems include Enhanced Mobile BroadBand (eMBB), Massive Machine Type Communication (mMTC), Ultra-Reliability Low-Latency Communication (URLLC), etc.

According to an embodiment of the disclosure, eMBB may be aimed to provide more improved data transmission rates than those supported by existing LTE, LTE-A or LTE-Pro. For example, in 5G or 6G communication systems, eMBB should be capable of providing a peak data rate of 20 Gbps in a downlink and a peak data rate of 10 Gbps in an uplink in terms of one base station. In addition, 5G or 6G communication systems should provide not only a peak data rate but also an actual increased user-perceived data rate of a UE. To satisfy such requirements, in 5G or 6G communication systems, improvement of various transmission/reception technologies, including more advanced multi-input multi-output (MIMO) transmission technology, may be required. Signals are transmitted using up to a transmission bandwidth of 20 MHz in a 2 GHz band used by the current LTE systems, whereas 5G or 6G communication systems use a frequency bandwidth greater than 20 MHz in a frequency band of 3-6 GHz or 6 GHz or higher and thus a data transmission rate required for 5G or 6G communication systems may be satisfied.

At the same time, mMTC has been considered to support application services, such as the Internet of Things (IoT) in 5G or 6G communication systems. In order to efficiently provide the Internet of Things, for mMTC, supporting of connection of large-scale UEs within a cell, improvement of coverage of UEs, improved battery times, reduction in costs of UEs, and the like may be required. The Internet of Things provides communication functions when employed with respect to various types of sensors or various types of devices and thus should support a large number of UEs (e.g., 1,000,000 UEs/km2) within a cell. Because UEs supporting mMTC are likely to be located in a dead spot, e.g., a basement of a building, which is not covered by a cell, according to features of a service, coverage wider than those of other services provided by 5G or 6G communication systems may be required. A UE supporting mMTC should be a low-cost UE and it is difficult to frequently replace a battery thereof, and thus, a very long battery life time, e.g., 10 to 15 years, may be required.

Lastly, URLLC may be used for cellular-based wireless communication services for a mission-critical purpose, e.g., remote control of robots or machinery, industrial automation, services for unmanned aerial vehicles, remote health care, emergency alerts, and the like. Therefore, communication provided by URLLC may need to provide very low latency (ultra-low latency) and very high reliability (super reliability). For example, a service supporting URLLC should satisfy an air interface latency of less than 0.5 milliseconds, and at the same time, may have a packet error rate of 10-5 or less. Therefore, for a service supporting URLLC, a 5G or 6G system should provide a transmission time interval (TTI) less than those of other services, and at the same time, design particulars for allocating a wide resource in a frequency band may be required to secure reliability of a communication link.

The three services considered in the 5G or 6G communication systems described above, i.e., eMBB, URLLC, and mMTC, may be multiplexed and transmitted in one system. In this case, different transmission and reception techniques and parameters may be used for services to satisfy different requirements of the services. However, mMTC, URLLC, and eMBB described above are only examples of different services and the types of services to which the disclosure is applicable are not limited thereto.

Although embodiments of the disclosure will be described below with respect to an LTE, LTE-A, LTE Pro, 5G (or NR or next-generation mobile communication) or 6G system as an example, embodiments of the disclosure may be also applied to other communication systems having similar technical backgrounds or channel types. Embodiments of the disclosure may be applied to other communication systems through some modifications by those of skilled in the art without greatly departing from the scope of the disclosure.

In the disclosure, "first frequency resource" refers to at least part of a frequency resource owned or managed by a first mobile communication provider. "second frequency resource" refers to at least part of a frequency resource owned or managed by a second mobile communication provider.

In the disclosure, a "mobile communication provider" refers to a service provider who owns or manages a network and provides a communication service to UEs. For example, the mobile communication provider may refer to a mobile virtual network operator (MNO) or a mobile virtual network operator (MVNO). However, the mobile communication provider is not limited to the MNO or the MVNO and may refer to any subject who can own or manage a frequency resource.

In the disclosure, "synchronization information" of a base station refers to information required for a UE to be synchronized with the base station. The synchronization information may include at least one of a cell ID, a cell ID group, or frame timing.

Before explaining methods for a base station to communicate with a UE using a resource of another base station according to embodiments of the disclosure, frame structures of an LTE system and an LTE-A system to which the disclosure is applicable will be described.

FIG. 1 is a diagram illustrating a basic structure of a time-frequency domain, which is a radio resource domain in which data or control information is transmitted, in an LTE system according to an embodiment of the disclosure.

Referring to FIG. 1, the horizontal axis represents a time domain and the vertical axis represents a frequency domain. A minimum transmission unit in the time domain is an orthogonal frequency division multiplexing (OFDM) symbol, $N_{symb}$ OFDM symbols 101 constitute one slot 102, and two slots constitute one subframe 103. A length of each slot is 0.5 ms and a length of each subframe is 1.0 ms. A radio frame 104 is a time domain unit composed of ten subframes. A minimum transmission unit in the frequency domain is a subcarrier, and a bandwidth of an entire system transmission bandwidth is composed of a total of $N_{BW}$ subcarriers 105. A basic unit of a resource in the time-frequency domain is a resource element (RE) 106 and may be represented by an OFDM symbol index and a subcarrier index. A resource block ((RB) or a physical resource block (PRB)) 107 is defined by $N_{symb}$ consecutive OFDM symbols 101 in the time domain and $N_{RB}$ consecutive subcarriers 108 in the frequency domain. Therefore, one RB 107 includes ($N_{symb} \times N_{RB}$) REs 106. Generally, a minimum transmission unit of data is an RB unit. Generally, in an LTE system, $N_{symb}=7$ and $N_{RB}=12$, and $N_{BW}$ and $N_{RB}$ are proportional to a bandwidth of a system transmission band.

Thereafter, downlink control information (DCI) in LTE and LTE-A systems will be described below.

In the LTE system, scheduling information for downlink data or uplink data is transmitted from a base station to a UE through DCI. DCI may be defined in several formats. The base station is operated by applying thereto a DCI format determined in advance according to whether the scheduling information is for uplink data or downlink data, whether the DCI is compact DCI having a small amount of control information, whether spatial multiplexing using multiple antennas is applied, whether the DCI is DCI for power control, or the like. For example, DCI format 1, which is scheduling control information for downlink data, is configured to include at least the following control information.

resource allocation type 0/1 flag: indicates whether a resource allocation method is type 0 or type 1. The type 0 method instructs to allocate resources in units of resource block groups (RBGs) by applying a bitmap method. In the LTE system, a basic unit of scheduling is a resource block (RB) represented by time and frequency domain resources, and an RBG includes a plurality of RBs and is used as a basic unit of scheduling in the type 0 method. The type 1 method instructs to assign a certain RB within an RBG.

resource block assignment: indicates RB allocated for data transmission. A resource to be expressed is determined according to a system bandwidth and a resource allocation method.

modulation and coding scheme (MCS): indicates a modulation method used for data transmission and the size of a transport block which is data to be transmitted.

HARQ process number: notifies a process number of a hybrid automatic repeat request (HARQ).

new data indicator: indicates whether the HARQ is initially transmitted or retransmitted.

redundancy version: indicates a redundancy version of the HARQ.

transmission power control (TPC) command for a physical uplink control channel (PUCCH): indicates a TPC command for a PUCCH.

The DCI is channel-coded and modulated and thereafter transmitted through a physical downlink control channel (PDCCH).

Cyclic redundancy check (CRC) is attached to a payload of a DCI message, and the CRC is scrambled with a radio network temporary identifier (RNTI) corresponding to the identity of the UE. Different RNTIs may be used according to a purpose of the DCI message, e.g., transmission of UE-specific data, a power control command or a random access response. For example, the RNTI may not be explicitly transmitted but may be transmitted while being included in a CRC calculation process. Upon receiving the DCI message transmitted in the PDCCH, the UE checks the CRC by using an RNTI allocated thereto and identifies that this message is transmitted thereto when a result of checking the CRC reveals correct.

Figure 2:
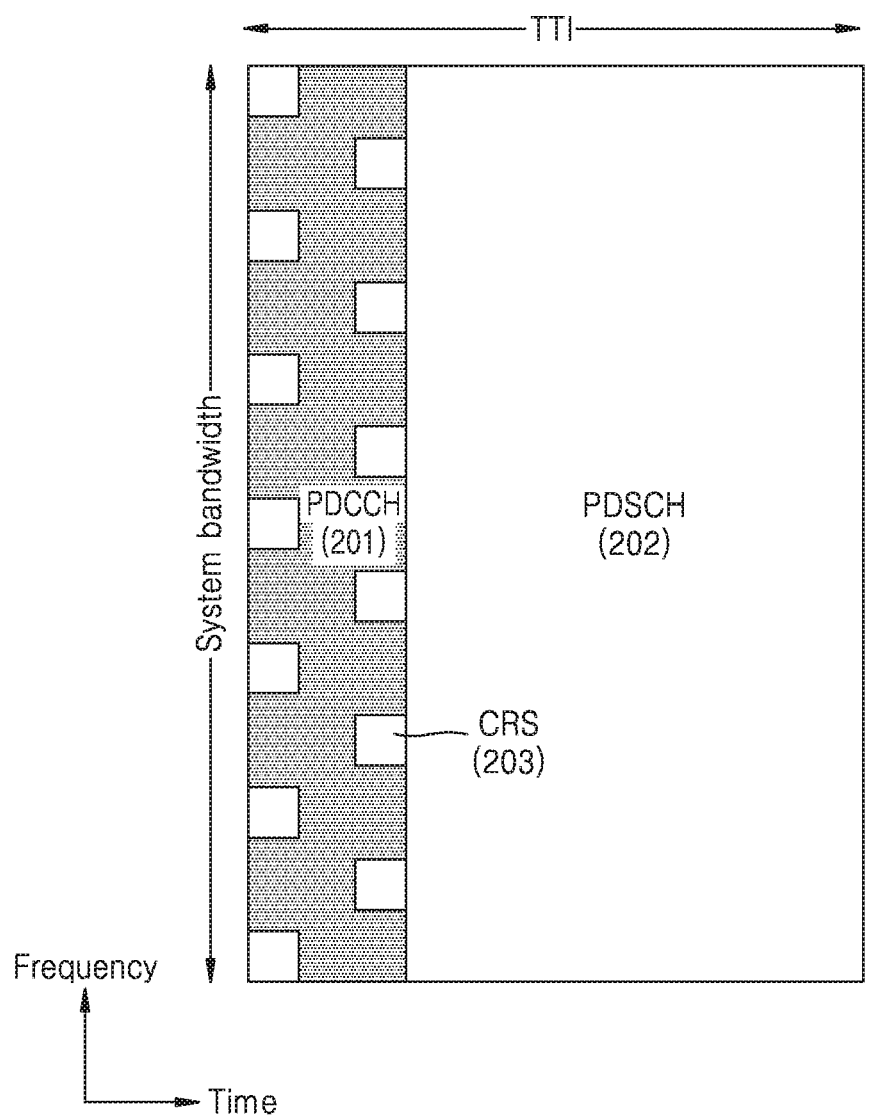
FIG. 2 is a diagram illustrating a physical downlink control channel (PDCCH) which is a downlink physical channel in which downlink channel information (DCI) of LTE is transmitted according to an embodiment of the disclosure.

FIG. 2 is a diagram illustrating a PDCCH 201 which is a downlink physical channel in which DCI of LTE is transmitted according to an embodiment of the disclosure.

Referring to FIG. 2, the PDCCH 201 may be time-multiplexed with a PDSCH 202, which is a data transmission channel, and transmitted over an entire system bandwidth. A region of the PDCCH 201 is expressed with the number of OFDM symbols, which is indicated, to a UE, as a Control Format Indicator (CFI) transmitted through a Physical Control Format Indicator Channel (PCFICH). Allocating the PDCCH 201 to an OFDM symbol in the front of a subframe allows the UE to decode downlink scheduling allocation as soon as possible, thereby reducing a delay in decoding of a downlink shared channel (DL-SCH), i.e., an overall downlink transmission delay.

One PDCCH carries one DCI message and multiple UEs may be simultaneously scheduled in a downlink and an uplink, and therefore, multiple PDCCHs are simultaneously transmitted in each cell. A cell-specific reference signal (CRS) 203 may be used as a reference signal for decoding the PDCCH 201. The CRS 203 may be transmitted for each subframe over an entire band, and scrambling and resource mapping may be changed according to cell identity (ID). Because the CRS 203 is a reference signal commonly used by all UEs, UE-specific beamforming cannot be used. Accordingly, a MIMO transmission method for an LTE PDCCH is limited to open-loop transmission diversity. The number of CRS ports is implicitly known to the UE by decoding of a physical broadcast channel (PBCH).

Resource allocation for the PDCCH 201 is based on a control-channel element (CCE), and one CCE includes nine resource element groups (REGs), i.e., a total of thirty six resource elements (REs). The number of CCEs required for a certain PDCCH 201 may be 1, 2, 4, or 8 and may vary according to a channel coding rate of a payload of a DCI message. The number of different CCEs is used to implement link adaptation of the PDCCH 201.

The UE should detect a signal in a state in which information about the PDCCH 201 is not known, and a search space indicating a set of CCEs for blind decoding is defined in LTE. The search space is composed of a plurality of sets at aggregation level (AL) of each CCE, and is not explicitly signaled but is implicitly defined using a function according to UE identity and a subframe number. In each subframe, the UE decodes the PDCCH 201 for all possible resource candidates achievable from CCEs in a set search space and processes information declared to be valid for the UE through CRC verification.

Search spaces are classified into a UE-specific search space and a common search space. A common search space of the PDCCH 201 may be examined by a certain group of UEs or all UEs to receive common cell control information, such as dynamic scheduling or paging messages related to system information. For example, scheduling allocation information of a DL-SCH for transmission of a System Information Block (SIB)-1 including cell operator information may be received by examining the common search space of the PDCCH 201.

In LTE, an entire PDCCH region is composed of a set of CCEs in a logical region and a search space composed of a set of CCEs exists. Search spaces are divided into a common search space and a UE-specific search space, and a search space for an LTE PDCCH is defined as follows.

---

The set of PDCCH candidates to monitor are defined in terms of search spaces, where a search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate m of the search space $S_k^{(L)}$ are given by $L \{(Y_k + m') \bmod \lfloor N_{CCE,k}/L \rfloor\} + i$
where $Y_k$ is defined below, $i = 0, \cdots, L - 1$.
For the common search space $m' = m$.
For the PDCCH UE specific search space, for the serving cell on which PDCCH is monitored, if the monitoring UE is configured with carrier indicator field then $m' = m + M^{(L)} \cdot n_{CI}$ where $n_{CI}$ is the carrier indicator field value, else if the monitoring UE is not configured with carrier indicator field then $m' = m$, where $m = 0, \cdots, M^{(L)} - 1$. $M^{(L)}$ is the number of PDCCH candidates to monitor in the given search space.
Note that the carrier indicator field value is the same as ServCellIndex
For the common search spaces, $Y_k$ is set to 0 for the two aggregation levels $L = 4$ and $L = 8$.
For the UE-specific search space $S_k^{(L)}$ at aggregation level$_L$, the variable $Y_k$ is defined by $Y_k = (A \cdot Y_{k-1}) \bmod D$
where $Y_{-1} = n_{RNTI} \neq 0$, $A = 3892'$, $D = 6553'$ and $k = \lfloor n_s/2 \rfloor$, $n_s$ is the slot number within a radio frame.
The RNTI value used for $n_{RNTI}$ is defined in subclause 7.1 in downlink and subclause 8 in uplink.

---

According to the above-described definition of the search space for the PDCCH, the UE-specific search space is not explicitly signaled but is implicitly defined using a function according to the identity of the UE and a subframe number. In other words, because a UE-specific search space may vary according to a subframe number, the UE-specific search space may change with time and a problem that a certain UE cannot use the search space due to other UEs (this problem is defined as blocking) may be fixed. When all CCEs examined by a UE are used by other UEs that are already scheduled in the same subframe and thus a UE cannot be scheduled in the same subframe, this problem may be prevented from occurring in a subsequent subframe because such a search space changes with time. For example, even when UE-specific search spaces of a first UE and a second UE partially overlap in a certain subframe, the UE-specific search spaces vary in each subframe and thus it is expected that a degree of the overlapping thereof in a subsequent subframe may change.

According to the above-described definition of the search space for the PDCCH, the common search space is defined as a set of predetermined CCEs, so that the PDCCH may be received by a certain group of UEs or all UEs. In other words, the common search space does not change according to UE identity or a subframe number. Although the common search space exists for transmission of various system messages, the common search space is available for transmission of control information of individual UEs. Therefore, the common search space is available as a solution to a phenomenon that scheduling of UEs is not possible due to an insufficient resource available in the UE-specific search space.

A search space is a set of candidate control channels consisting of CCEs to be decoded by a UE at a given aggregation level, and there are various aggregation levels at which one, two, four or eight CCEs form a bundle. Thus, the UE has multiple search spaces. The number of PDCCH candidates to be monitored by a UE in a search space defined according to aggregation level in an LTE PDCCH is defined as shown in the following table.

TABLE 1

| Type | Search space $S_k^{(L)}$ Aggregation Level $L$ | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

According to Table 1, in the case of the UE-specific search space, aggregation levels $\{1, 2, 4, 8\}$ are supported and $\{6, 6, 2, 2\}$ PDCCH candidate groups are respectively provided therefor. In the case of the common search space, aggregation levels $\{4, 8\}$ are supported and $\{4, 2\}$ PDCCH candidate groups are respectively provided therefor. The reason why the common search space supports only the $\{4, 8\}$ aggregation levels is to improve coverage characteristics because in general, system messages should reach an edge of each cell.

DCI transmitted to the common search space is defined only for certain DCI formats, such as DCI formats 0/1A/3/3A/1C corresponding to a purpose, such as power control for system messages or UE groups. DCI formats with spatial multiplexing are not supported in the common search space. A downlink DCI format to be decoded in the UE-specific search space varies according to a transmission mode set for a corresponding UE. Because a transmission mode is set by RRC signaling, a correct subframe number is not specified as to whether the setting of the transmission mode is effective for the corresponding UE. Therefore, the UE may be operated to always perform decoding with respect to the DCI format 1A regardless of a transmission mode so as to prevent loss of communication.

The methods of transmitting or receiving the downlink control channel and the downlink control information, and the search space in LTE and LTE-A have been described above. A downlink control channel in a 5G or 6G communication system will be described below.

Figure 3:
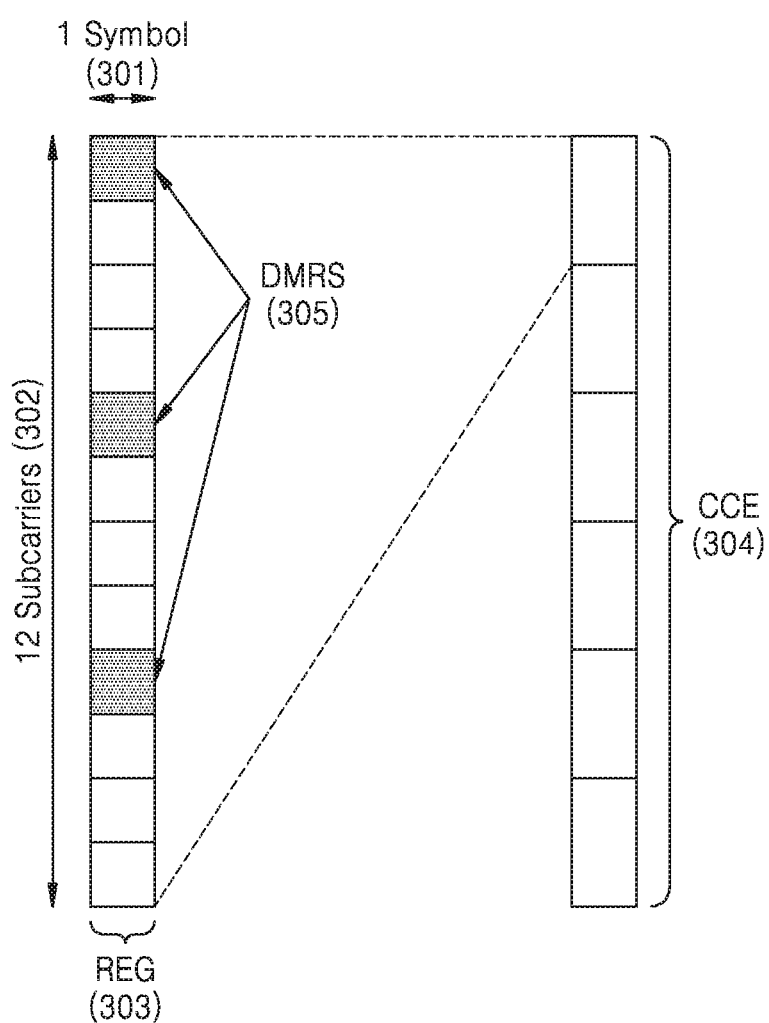
FIG. 3 is a diagram illustrating a basic unit of time and frequency resources constituting a downlink control channel available in a 5G or 6G communication system according to an embodiment of the disclosure.

FIG. 3 is a diagram illustrating a basic unit of time and frequency resources constituting a downlink control channel available in a 5G or 6G communication system according to an embodiment of the disclosure.

Referring to FIG. 3, a basic unit REG of time and frequency resources constituting a control channel is composed of one OFDM symbol 301 on a time axis and twelve subcarriers 302, i.e., one RB, on a frequency axis. It is assumed that a basic unit of the time axis is one OFDM symbol 301 when a basic unit of the control channel is set, thereby time-multiplexing a data channel and the control channel in one subframe. A user's processing time may be reduced by positioning the control channel ahead of the data channel, thus making it easy to meet latency time requirements. Frequency multiplexing may be more efficiently performed between the control channel and the data channel by setting a basic unit of the frequency axis of the control channel to one RB.

Channel regions of various sizes may be set by connecting REGs 303 illustrated in FIG. 3. For example, when a basic unit to which a downlink control channel is allocated in 5G or 6G is a CCE 304, one CCE 304 may be composed of a plurality of REGs 303. For example, in the case of the REG 303 of FIG. 3, when the REG 303 consists of twelve REs and one CCE 304 consists of six REGs 303, one CCE 304 may consist of seventy two REs. When a downlink control region is set, this region may consist of a plurality of CCEs 304, and a certain downlink control channel may be transmitted while being mapped to one or more CCEs 304 according to an aggregation level AL in a control region. The CCEs 304 in the control region are identified using numbers. In this case, the numbers may be assigned according to a logical mapping method.

The basic unit of the downlink control channel of FIG. 3, i.e., the REG 303, may include both REs to which DCI is mapped and a region to which a demodulation reference signal (DMRS) 305, which is a reference signal for decoding the DCI, is mapped. As illustrated in FIG. 3, the DMRS 305 may be transmitted in three REs in one REG 303. For reference, because the DMRS 305 is transmitted using precoding, such as a control signal mapped in the REG 303, a UE may decode the DMRS 305 without information about precoding applied by a base station.

Figure 4:
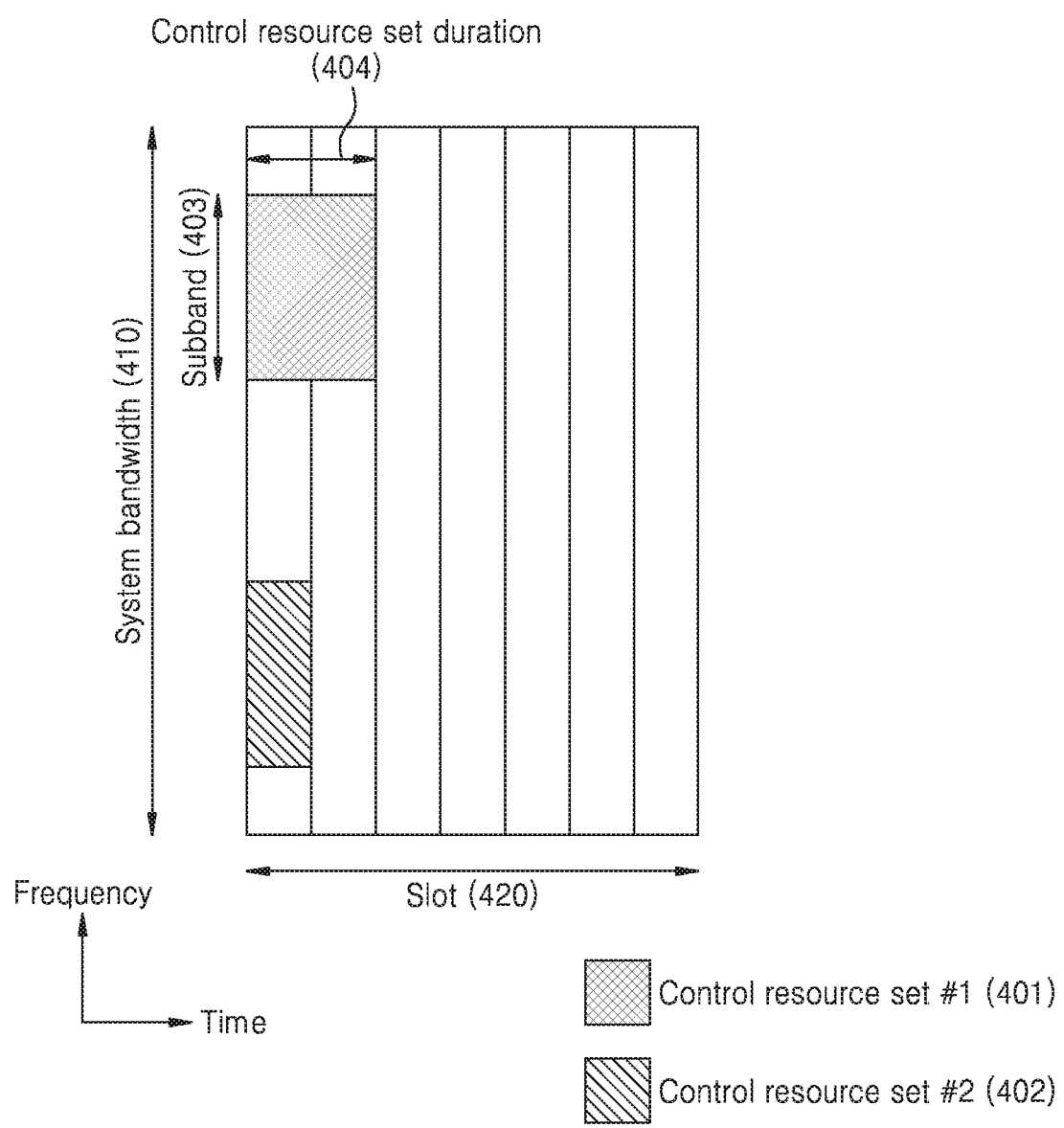
FIG. 4 is a diagram illustrating a control region, i.e., control resource set, CORESET, in a 5G or 6G wireless communication system, in which a downlink control channel is transmitted according to an embodiment of the disclosure.

FIG. 4 is a diagram illustrating a control region (control resource set CORESET) in a 5G or 6G wireless communication system, in which a downlink control channel is transmitted according to an embodiment of the disclosure.

Referring to FIG. 4, a frequency axis represents a system bandwidth 410, and a time axis represents one slot 420 in which two control regions (a first control resource set 401 and a second control resource set 402) are set (it is assumed in the example of FIG. 4 that one slot corresponds to seven OFDM symbols). The control resource sets 401 and 402 may be set to correspond to a certain subband 403 of the entire system bandwidth 410 on the frequency axis. The control resource sets 401 and 402 may be set to one or more OFDM symbols on the time axis, and the number of symbols may be defined as a control resource set duration 404. In FIG. 4, the first control resource set 401 is set to a control resource set duration of two symbols, and the second control resource set 402 is set to a control resource set duration of one symbol.

In the above-mentioned 5G or 6G system, a control region may be set, by a base station, through higher-layer signaling (e.g., system information, a master information block (MIB), or radio resource control (RRC) signaling) to a UE. The setting of the control region for the UE refers to proving the UE with information, such as a position of the control region, a subband, resource allocation for the control region, and a control resource set duration. For example, the information provided by the base station may include the following information.

TABLE 2 setting information 1. frequency-axis RB allocation information
setting information 2. control-region start symbol
setting information 3. control resource set duration
setting information 4. REG bundling size (2 or 3 or 6)
setting information 5. transmission mode (interleaved transmission method or non-interleaved transmission method)
setting information 6. DMRS setting information (precoder granularity)
setting information 7. search space types (common search space, group-common search space, and UE-specific search space)
setting information 8. DCI format to be monitored in corresponding control region
other information In addition to the above setting information, various types of information necessary to transmit a downlink control channel may be set for the UE.

Thereafter, downlink control information (DCI) in a 5G or 6G system will be described below.

In the 5G or 6G system, scheduling information for uplink data (physical uplink shared channel (PUSCH)) or downlink data (physical downlink shared channel (PDSCH)) is transmitted from a base station to a UE through DCI. The UE may monitor a fallback DCI format and a non-fallback DCI format for the PUSCH or the PDSCH. The fallback DCI format may consists of a fixed field between the base station and the UE, and the non-fallback DCI format may include a configurable field.

Fallback DCI for scheduling the PUSCH may include, for example, the following information.

TABLE 3

Identifier for DCI formats-[1] bit
Frequency domain resource assignment-
$[\lceil log_2(N_{RB}^{UL,BWP}(N_{RB}^{UL,BWP}+1)/2)\rceil]$ bits
Time domain resource assignment-X bits
Frequency hopping flag-1 bit.
Modulation and coding scheme-[5] bits
New data indicator-1 bit
Redundancy version-[2] bits
HARQ process number-[4] bits
TPC command for scheduled PUSCH-[2] bits
UL/SUL indicator-0 or 1 bit Non-fallback DCI for scheduling the PUSCH may include, for example, the following information.

TABLE 4

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{UL,BWP} / P \rceil$ bits
    For resource allocation type 1, $\lceil log_2 (N_{RB}^{UL,BWP} (N_{RB}^{UL,BWP} + 1) / 2) \rceil$ bits
Time domain resource assignment - 1, 2, 3, or 4 bits
VRB-to-PRB mapping - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits as defined in section x.x of [6, TS38.214]
HARQ process number - 4 bits
1st downlink assignment index - 1 or 2 bits
    1 bit for semi-static HARQ-ACK codebook;
    2 bits for dynamic HARQ-ACK codebook with single HARQ-ACK codebook.
2nd downlink assignment index - 0 or 2 bits
    2 bits for dynamic HARQ-ACK codebook with two HARQ-ACK sub-codebooks;
    0 bit otherwise.
TPC command for scheduled PUSCH - 2 bits SRS resource indicator $- \left\lceil log_2 \left( \sum_{k=1}^{L_{max}} \binom{N_{SRS}}{k} \right) \right\rceil$ or $\lceil log_2(N_{SRS}) \rceil$ bits $\left\lceil log_2 \left( \sum_{k=1}^{L_{max}} \binom{N_{SRS}}{k} \right) \right\rceil$ bits for non-codebook based PUSCH transmission;

TABLE 4-continued

⌈log$_2$(N$_{SRS}$)⌉ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 2 bits.
beta_offset indicator - 2 bits
DMRS sequence initialization - 0 or 1 bit
UL/SUL indicator - 0 or 1 bit Fallback DCI for scheduling the PDSCH may include, for example, the following information.

TABLE 5

Identifier for DCI formats-[1] bit
Frequency domain resource assignment-
[⌈$log_2(N_{RB}^{DL,BWP}(N_{RB}^{DL,BWP}+1)/2)$⌉] bits
Time domain resource assignment-X bits
VRB-to-PRB mapping-1 bit.
Modulation and coding scheme-[5] bits
New data indicator-1 bit
Redundancy version-[2] bits
HARQ process number-[4] bits
Downlink assignment index-2 bits
TPC command for scheduled PUCCH-[2] bits
PUCCH resource indicator-[2] bits
PDSCH-to-HARQ feedback timing indicator-[3] bits Non-fallback DCI for scheduling the PDSCH may include, for example, the following information.

TABLE 6

Carrier indicator-0 or 3 bits
Identifier for DCI formats-[1] bits
Bandwidth part indicator-0, 1 or 2 bits
Frequency domain resource assignment
    For resource allocation type 0, $\lceil N_{RB}^{DL,BWP}/P \rceil$ bits
    For resource allocation type 1, $\lceil log_2(N_{RB}^{DL,BWP}(N_{RB}^{DL,BWP}+1)/2) \rceil$ bits
Time domain resource assignment-1, 2, 3, or 4 bits
VRB-to-PRB mapping 0 or 1 bit, only for resource allocation type 1.
    0 bit if only resource allocation type 0 is configured;
    1 bit otherwise.
PRB bundling size indicator-1 bit
Rate matching indicator-0, 1, 2 bits
ZP CSI-RS trigger-X bits
For transport block 1:
    Modulation and coding scheme-5 bits
    New data indicator-1 bit
    Redundancy version-2 bits
For transport block 2:
    Modulation and coding scheme-5 bits
    New data indicator-1 bit
    Redundancy version-2 bits
HARQ process number-4 bits
Downlink assignment index-0 or 4 bits
TPC command for scheduled PUCCH-2 bits
PUCCH resource indicator
PDSCH-to-HARQ_feedback timing indicator-3 bits
Antenna ports-up to 5 bits
Transmission configuration indication-3 bits
SRS request-2 bits
CBG transmission information-0, 2, 4, 6, or 8 bits
CBG flushing out information-0 or 1 bit
DMRS sequence initialization-0 or 1 bit DCI may be channel-coded and modulated and thereafter transmitted through a physical downlink control channel (PDCCH). Cyclic redundancy check (CRC) is attached to a payload of a DCI message, and the CRC is scrambled with a radio network temporary identifier (RNTI) corresponding to the identity of the UE. Different RNTIs may be used according to a purpose of the DCI message, e.g., UE-specific data transmission, a power control command or a random access response. For example, the RNTI is not explicitly transmitted but is transmitted while being included in a CRC calculation process. Upon receiving the DCI message transmitted in the PDCCH, the UE checks the CRC by using an RNTI allocated thereto and identifies that this message is transmitted thereto when a result of checking the CRC reveals correct.

For example, DCI for scheduling a PDSCH for system information (SI) may be scrambled with an SI-RNTI. DCI for scheduling a PDSCH for a random access response (RAR) message may be scrambled with an RA-RNTI. DCI for scheduling a PDSCH for a paging message may be scrambled with a P-RNTI. DCI notifying a slot format indicator (SFI) may be scrambled with an SFI-RNTI. DCI notifying transmission power control (TPC) may be scrambled with a TPC-RNTI. DCI for scheduling a UE-specific PDSCH or PUSCH may be scrambled with a cell RNTI (C-RNTI).

When a data channel, i.e., a PUSCH or a PDSCH, is scheduled for a certain UE through the PDCCH, data in the scheduled resource region is transmitted or received together with DMRS.

Figure 5:
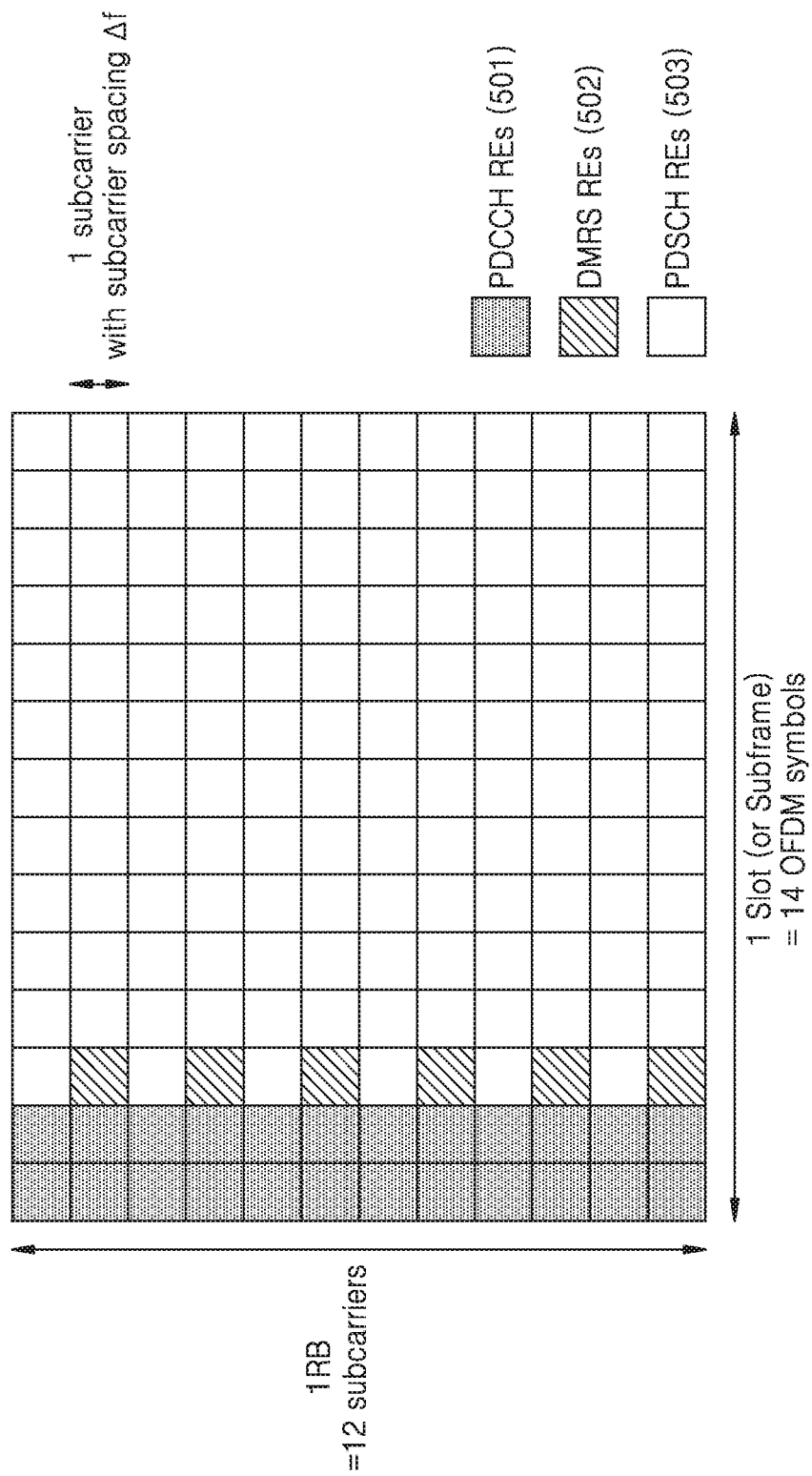
FIG. 5 illustrates a case in which a user equipment (UE) is set to use fourteen orthogonal frequency division multiplexing (OFDM) symbols as one slot (or subframe) in a downlink, a PDCCH is transmitted in two initial OFDM symbols, and a demodulation reference signal (DMRS) is transmitted in a third symbol according to an embodiment of the disclosure.

FIG. 5 illustrates a case in which a UE according to an embodiment of the disclosure is set to use fourteen OFDM symbols as one slot (or subframe) in a downlink, transmit a PDCCH 501 in two initial OFDM symbols, and transmit a DMRS in a third symbol according to an embodiment of the disclosure.

Referring to FIG. 5, in a certain RB for which a PDSCH is scheduled, the PDSCH 503 may be transmitted, in which data is mapped to REs of a third symbol in which a DMRS 502 is not transmitted and REs of a fourth symbol to a last symbol. A subcarrier spacing Δf may be 15 kHz in the case of an LTE/LTE-A system, and one of {15, 30, 60, 120, 240, 480} kHz may be used in the case of a 5G or 6G system.

In a wireless communication system, a certain spectrum resource may be exclusively allocated for a certain service. Typically, in the case of cellular communication, a country rents a specific spectrum resource to a specific mobile communication provider, and the mobile communication provider to which the spectrum resource may exclusively use this resource to maintain a cellular network. However, a spectrum allocated to each mobile communication provider is not sufficiently utilized except for a spatiotemporal situation in which data traffic is very high, and thus, resource waste may occur.

According to an embodiment of the disclosure, in order to address the above-mentioned resource waste situation, a situation in which dynamic frequency sharing between mobile communication providers is implementable may be considered. For example, a spectrum resource that each mobile communication provider has a right to preferentially use may be allocated to each mobile communication provider but may be permitted to be used by other mobile communication providers when the amount of the spectrum resource used is small. When each mobile communication provider may share resources of other mobile communication providers, each mobile communication provider may not need to be allocated an unnecessarily large spectrums to cope with a maximum traffic situation. Therefore, spectrum resources may be effectively operated according to a dynamic frequency sharing system between mobile communication providers.

However, when dynamic frequency sharing is possible between mobile communication providers, synchronization-related problems may occur. In a cellular network (e.g., LTE or NR), a base station may periodically transmit a synchronization signal and a UE may listen to the synchronization signal and identify synchronization information at a corresponding frequency. In this case, synchronization signals transmitted by multiple base stations of the same mobile communication provider may be simultaneously received and thus identifiers (e.g., cell IDs) for distinguishing between the base stations exist. However, in a dynamic frequency sharing scenario between mobile communication providers, multiple base stations of several mobile communication providers need to be considered and thus it may be difficult to use a method of transmitting and receiving a synchronous signal in an existing cellular network. Therefore, identification information for distinguishing between mobile communication providers may be needed.

A method of communicating with a UE, the method being performed by a base station by using a resource of another base station, according to an embodiment of the disclosure will be described with reference to FIGS. 6 to 25 below.

Figure 6:
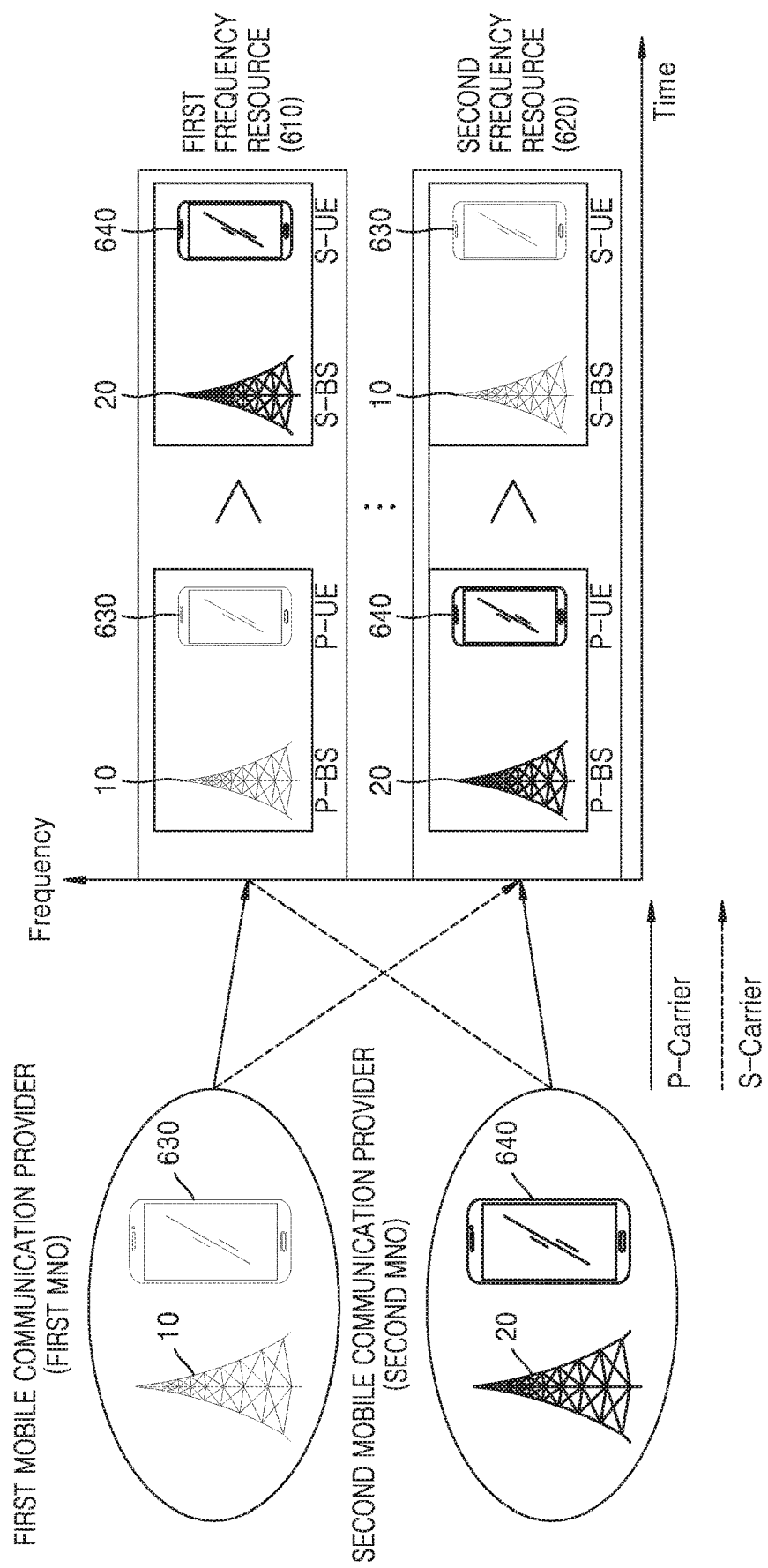
FIG. 6 is a diagram illustrating a concept of a method of communicating with a UE by using a frequency resource of a second mobile communication provider, the method being performed by a first base station of a first mobile communication provider according to an embodiment of the disclosure.

FIG. 6 is a diagram illustrating a concept of a method of communicating with a UE by using a frequency resource of a second mobile communication provider, the method being performed by a first base station of a first mobile communication provider according to an embodiment of the disclosure.

Referring to FIG. 6, a first mobile communication provider may manage a first base station 10 and provide a service through first frequency resource 610. The first base station 10 may establish communication with a UE by using some of all the first frequency resource 610.

The first UE 630 may be a UE subscribed to a communication service provided by the first mobile communication provider, and a second UE 640 may be a UE subscribed to a communication service provided by the second mobile communication provider. The first UE 630 may receive a communication service from the first mobile communication provider through the first base station 10, and the second UE 640 may receive a communication service from the second mobile communication provider through a second base station 20.

The first mobile communication provider may provide a communication service to a UE through a frequency resource owned or managed by the first mobile communication provider. However, according to an embodiment of the disclosure, the first mobile communication provider may communicate with the first UE 630 through second frequency resource that are not owned or managed by the first mobile communication provider. For example, the first mobile communication provider may communicate with the first UE 630 through the first base station 10 by using second frequency resource 620 owned or managed by the second mobile communication provider.

When the first base station 10 establishes communication through the first frequency resource 610, the first base station 10 may be referred to as a primary base-station (P-BS) with respect to the first frequency resource 610. The first frequency resource 610 may be referred to as a primary-carrier (P-carrier) with respect to the first base station 10. When the first base station 10 establishes communication through the second frequency resource 620, the first base station 10 may be referred to as a secondary base-station (S-BS) with respect to the second frequency resource 620. The second frequency resource 620 may be referred to as a secondary-carrier (S-carrier) with respect to the first base station 10. Similarly, a UE may be referred to as a primary-UE (P-UE) when establishing communication through the P-BS and the P-Carrier, and may be referred to as a secondary-UE (S-UE) when establishing communication through the S-BS and the S-carrier.

A UE may communicate with a base station through a frequency resource by obtaining synchronization information of the base station. For example, the first UE 630 may receive synchronization information of the first base station 10 transmitted from the first base station 10 through the first frequency resource 610 to communicate with the first base station 10 through the first frequency resource 610. The first UE 630 may communicate with the first base station 10, based on the received synchronization information.

However, because frequency resources are independent and synchronization may be independently performed therethrough, synchronization information with respect to each of the frequency resources may be different. Therefore, the synchronization information of the first base station 10 in the second frequency resource 620 may be needed to be obtained, so that the first UE 630 may communicate with the first base station 10 through the second frequency resource 620.

In an embodiment of the disclosure, the first UE 630 may obtain the synchronization information of the first base station 10 from the second frequency resource 620 according to various methods. For example, the first UE 630 may obtain the synchronization information of the first base station 10 from the first base station 10 through the first frequency resource 610 or the second frequency resource 620. Alternatively, the first UE 630 may obtain the synchronization information of the first base station 10 from the second base station 20.

When both the synchronization information of the first base station 10 and the synchronization information of the second base station 20 are transmitted through the second frequency resource 620, identification information for allowing the first UE 630 to identify synchronization information (i.e., the synchronization information of the first base station 10 in FIG. 1) provided by a mobile communication provider to which the first UE 630 is subscribed may be needed. Accordingly, according to an embodiment of the disclosure, identification information (e.g., MNO ID) of a mobile communication provider may be included in synchronization information transmitted from a base station.

According to an embodiment of the disclosure, when a plurality of base stations establish communication using the same frequency resource, priority of communication between the P-BS and the P-UE may be higher than that of communication between the S-BS and the S-UE. For example, referring to FIG. 1, when each of the first base station 10 and the second base station 20 uses the second frequency resource 620 to communicate with a UE to which a service is to be provided, the priority of communication between the second base station 20 which is a P-BS and the second UE 640 which is a P-UE with respect to the second frequency resource 620 may be than that of communication between the first base station 10 which is an S-BS and the first UE 630 with respect to the second frequency resource 620. Communication with high priority may be performed preferentially. For example, time and frequency resources may be preferentially allocated for high-priority communication.

Various methods of obtaining synchronization information of the first base station 10 regarding communication using the second frequency resource 620, the methods being performed by the first UE 630, will be described with reference to FIGS. 7 to 25 below.

Figure 7:
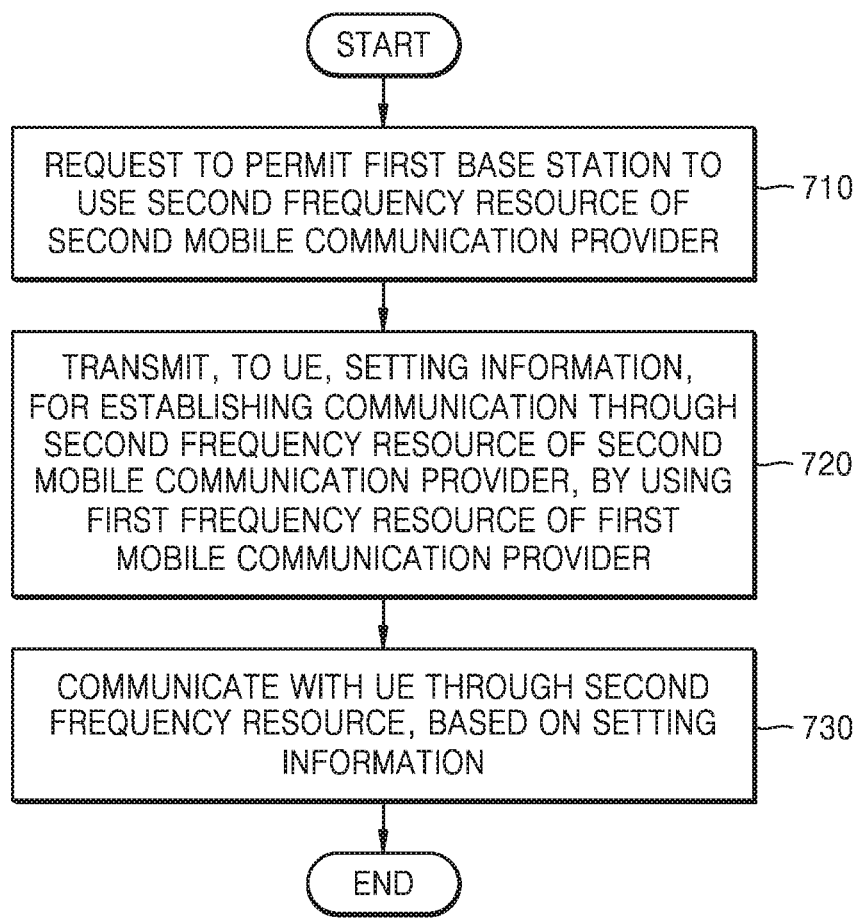
FIG. 7 is a flowchart of a method of communicating with a UE by using a frequency resource of a second mobile communication provider, the method being performed by a first base station of a first mobile communication provider according to an embodiment of the disclosure.

FIG. 7 is a flowchart of a method of communicating with a UE by using a frequency resource of a second mobile communication provider, the method being performed by a first base station of a first mobile communication provider according to an embodiment of the disclosure.

Referring to FIG. 7, in operation 710, the first base station may request to permit the first base station to use a second frequency resource of the second mobile communication provider.

According to an embodiment of the disclosure, the first base station may request a second base station to permit the first base station to use the second frequency resource. A condition or an environment under which the first base station requests the second base station to permit the first base station to use the second frequency resource may be variously determined. For example, the first base station may request the second base station to permit use of the second frequency resource in case of saturation of a frequency resource of the first mobile communication provider or when the amount of allocated frequency resource exceeds a certain threshold. However, a condition under which the first base station requests permission to use the second frequency resource is not limited thereto.

The first base station may also request a server of the second mobile communication provider or a base station other than the second base station to permit use of the second frequency resource. However, for convenience of description, a case in which the first base station requests the second base station to permit use of the second frequency resource will be described as an example.

In an embodiment of the disclosure, the request to permit use of the second frequency resource may include various information necessary for the first base station to use the second frequency resource. For example, the request to permit use of the second frequency resource may include information about time and frequency resources determined by the first base station to be used for communication with a UE through the second frequency resource. The request to permit use of the second frequency resource may further include information requesting to allocate time and frequency resources to be usable by the first base station. The request to permit use of the second frequency resource may further include information about time and frequency resources for the first base station to transmit synchronization information thereof to a UE by using the second frequency resource. The request to permit use of the second frequency resource may further include identification information of the first mobile communication provider managing the first base station or information requesting to allocate the identification information of the first mobile communication provider.

The first base station may receive a response to the request to permit use of the second frequency resource from the second base station, and communicate with a UE, based on the received response.

In an embodiment of the disclosure, the request to permit use of the second frequency resource may be a notification informing that the first base station will use the second frequency resource. For example, the first base station may use the second frequency resource without receiving a response to the request to permit use of the second frequency resource from the second base station. For example, the first base station may communicate with the UE by using frequency and time resources about whose use the first base station has informed the second base station.

In an embodiment of the disclosure, when the second base station does not permit the first base station to use the second frequency resource, the second base station may transmit a message (e.g., negative-acknowledgement (NACK)) informing that the second frequency resource is not available to the first base station. The first base station may not use the second frequency resource when receiving the message rejecting the request from the second base station.

In an embodiment of the disclosure, the second base station may transmit a message instructing to stop the use of the second frequency resource to the first base station while the first base station is communicating with the UE by using the second frequency resource. The first base station may not transmit a signal to or receive a signal from the UE through the second frequency resource when receiving the message instructing to stop the use of the second frequency resource.

In operation 720, the first base station may transmit setting information, for establishing communication through the second frequency resource of the second mobile communication provider, to the UE by using the first frequency resource of the first mobile communication provider.

In an embodiment of the disclosure, the setting information may be information which is set by the first base station to instruct the UE to use the second frequency resource. The setting information may include information about a band of the second frequency resource. The UE may be set in advance to communicate with the first base station of the first mobile communication provider not only through the first frequency resource of the first mobile communication provider to which the UE is subscribed but also the second frequency resource of the second mobile communication provider to which the UE is not subscribed.

Information about the band of the second frequency resource may be previously stored in the UE. The setting information transmitted from the first base station to the UE may include information for setting the UE to activate communication using the second frequency resource.

Alternatively, the setting information may include information about a method for the UE to obtain synchronization information corresponding to the first base station in the second frequency resource. For example, the setting information may include information for setting the UE to obtain the synchronization information corresponding to the first base station from the second frequency resource through the first frequency resource. In addition, the setting information may include information for setting the synchronization information corresponding to the first base station to be obtained through the second frequency resource.

In an embodiment of the disclosure, the setting information may include information for setting the UE to obtain the synchronization information corresponding to the first base station from the second base station. However, a method of obtaining synchronization information is not limited to the above example, and the first base station may set and provide various methods of obtaining the synchronization information corresponding to the first base station through the setting information.

The UE may be configured to receive the setting information and obtain the synchronization information corresponding to the first base station from the second frequency resource, based on the received setting information.

In an embodiment of the disclosure, when information about the method for the UE to obtain the synchronization information corresponding to the first base station is previously set in the UE, the setting information may not include information about this method.

In addition, the setting information may include information about time and frequency resources through which the first base station may communicate with the UE by using the second frequency resource. For example, the setting information may include information about time and frequency resources through which the first base station transmits the synchronization information to communicate with the UE by using the second frequency resource. The setting information may further include identification information of the first mobile communication provider which manages the first base station.

In operation 730, the first base station may communicate with the UE through the second frequency resource, based on the setting information.

The first base station may transmit, to the UE, the synchronization information for the first base station to communicate with the UE by using the second frequency resource, based on the setting information. The terminal may obtain the synchronization information of the first base station, based on the setting information received from the first base station. A base station and the UE may transmit or receive control information or data by using the second frequency resource, based on the synchronization information.

Figure 8:
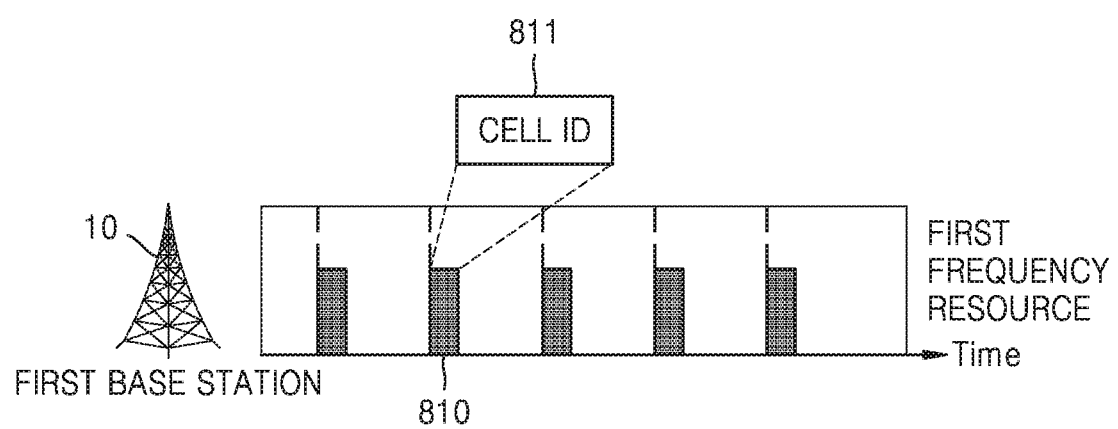
FIG. 8 is a diagram illustrating a synchronization signal according to an embodiment of the disclosure.

FIG. 8 is a diagram illustrating a synchronization signal according to an embodiment of the disclosure.

Referring to FIG. 8, when a first base station 10 of a first mobile communication provider communicates with a UE through a first frequency resource of the first mobile communication provider, the first base station 10 may transmit a periodic synchronization signal 810 to the UE.

The periodic synchronization signal 810 may include a cell ID 811 through which the UE may identify a cell. In addition, the periodic synchronization signal 810 may include a primary synchronization signal (PSS) and a secondary synchronization signal (SSS). The periodic synchronization signal 810 may include a synchronization signal (SS) block which includes a PSS, an SSS, and a physical broadcast channel (PBCH) in an NR system. The PSS, the SSS, the PBCH and the SS block are well-known in the field of mobile communication technology and thus a detailed description thereof will be omitted here.

In an environment in which each mobile communication provider communicates with a UE subscribed to a communication service provided by each mobile communication provider using only a frequency resource owned or managed by the mobile communication provider, synchronization information received by the UE is relates to the mobile communication which is provided by the mobile communication provider and to which the UE is subscribed. Accordingly, the UE may not need to additionally identify the mobile communication provider due to synchronization information, and the periodic synchronization signal 810 transmitted from the first base station 10 to the UE may not include the identification information of the first mobile communication provider 10.

Figure 9:
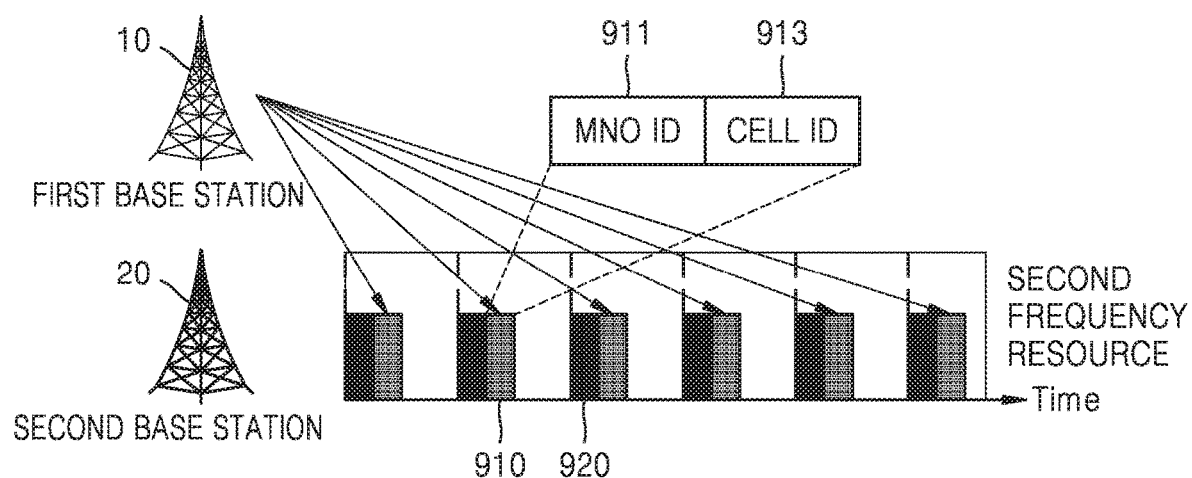
FIG. 9 is a diagram illustrating a synchronization signal including identification information of a mobile communication provider according to an embodiment of the disclosure.

FIG. 9 is a diagram illustrating a synchronization signal including identification information of a mobile communication provider according to an embodiment of the disclosure.

Referring to FIG. 9, when a first base station 10 and a second base station 20 share a second frequency resource, the first base station 10 may transmits a first synchronization signal 910 and the second base station 20 may transmit a second synchronization signal 920 through the second frequency resource.

In an environment in which each mobile communication provider not only uses a frequency resource owned or managed by each mobile communication provider but also shares frequency resources owned or managed by other mobile communication providers, there may be a need to distinguish between synchronization signals transmitted from base stations of different mobile communication providers through the same frequency resource. In an embodiment of the disclosure, a periodic synchronization signal transmitted from a base station may include identification information of a mobile communication provider that manages the base station. For example, the synchronization signal may include a mobile network operator identifier (MNO ID) as the identification information of the mobile communication provider. For example, the first synchronization signal 910 transmitted from the first base station 10 may include a cell ID 913 and an MNO ID 911. Similarly, the second synchronization signal 920 transmitted from the second base station 20 may include a cell ID and an MNO ID.

When receiving a synchronization signal transmitted from a plurality of base stations through the second frequency resource, a UE may identify a synchronization signal, which is transmitted from a base station of a mobile communication provider that provides a communication service to the UE, by identifying an MNO ID included in the synchronization signal.

In order for the UE to identify the mobile communication provider through the identification information of the mobile communication provider, information about a correspondence between the mobile communication provider and the identification information may be required. In an embodiment of the disclosure, each of mobile communication providers may be assigned a unique global MNO ID to distinguish between all the mobile communication providers. In addition, each of mobile communication providers may be assigned a unique local MNO ID to distinguish between all the mobile communication providers that provide communication services within a certain region (e.g., a country or state). When each mobile communication provider is assigned a local MNO ID, the amount of information (e.g., the number of bits included in a synchronization signal) required to distinguish between mobile communication providers may be small and resources may be utilized more efficiently.

In an embodiment of the disclosure, information about an MNO ID allocated to each mobile communication provider may be previously stored in a UE. Alternatively, only an MNO ID of a mobile communication provider providing a communication service to a UE may be stored in the UE. Alternatively, a base station of the mobile communication provider may transmit the MNO ID to the UE. For example, the first base station 10 may transmit information about a unique MNO ID of the first mobile communication provider to a UE. The UE may identify the MNO ID of the first mobile communication provider, based on the information transmitted thereto, and may store the identified MNO ID.

Alternatively, the UE may identify a mobile communication provider providing a communication service thereto by distinguishing at least one mobile communication provider that transmits a synchronization signal through the second frequency resource. For example, the UE may not need information for distinguishing between the mobile communication provider providing a communication service thereto and the other mobile communication providers that do not perform communication services thereto through the second frequency resource.

In an embodiment of the disclosure, the MNO ID of the mobile communication provider that manages the first base station 10 may be set or allocated by the second base station 20. The second base station 20 may allocate MNO IDs to at least one base station requesting the second base station 20 to provide the second frequency resource and the second base station 20 itself so as to distinguish between mobile communication providers managing base stations. The UE may receive the allocated MNO ID from the first base station 10 or the second base station 20. When the MNO IDs are allocated by the second base station 20, there is no need to distinguish between other mobile communication providers that do not establish communication through the second frequency resource due to the MNO IDs and thus the amount of information about the MNO IDs to be transmitted may be small.

A method of transmitting identification information (e.g., an MNO ID) of a mobile communication provider through a synchronization signal may be variously determined.

In an embodiment of the disclosure, an MNO ID may not be additionally included in a synchronization signal, and different mobile communication providers may be distinguished using a frequency resources in which the synchronization signal is transmitted.

In an LTE system, a PSS and an SSS may be transmitted in a frequency resource while being located at the center of a carrier. In an NR system, an SS block may be transmitted in a frequency resource while being located in a synchronization raster. For example, in the LTE system and the NR system, a frequency resource that a UE should attempt to receive so as to search for a PSS, an SSS or an SS block may be limited. In an embodiment of the disclosure, a base station may transmit a synchronization signal through a frequency resource other than a frequency resource through which a PSS, an SSS or a SS block is transmitted in an existing LTE or NR system, and a UE may identify a mobile communication provider through identification of the frequency resource through which the synchronization signal is received from the base station.

For example, the first base station 10 may transmit to a UE a synchronization signal in a second frequency resource of a second mobile communication provider through a third frequency resource other than a frequency domain through which the second synchronization signal 920 of the second base station 20 is transmitted. When the synchronization signal is received through the third frequency resource, the UE may identify that the synchronization signal is a synchronization signal for a communication service provided by the first mobile communication provider. When the UE is not a UE which receives a communication service from the first mobile communication provider, the UE may ignore the synchronization signal transmitted through the third frequency resource.

Mapping information between a frequency resource in which a synchronization signal is transmitted and a mobile communication provider may be required for a UE to identify the mobile communication provider through the frequency resource through which the synchronization signal is received. For example, the mapping information may include information indicating that the synchronization signal is transmittable through the third frequency resource when the first mobile communication provider provides a communication service through a frequency resource of the second mobile communication provider.

In an embodiment of the disclosure, mapping information between a frequency resource in which a synchronization signal is transmitted and a mobile communication provider may be previously stored in a UE. Alternatively, only mapping information corresponding to a mobile communication provider that provides a communication service to a UE may be stored in the UE. Alternatively, a base station of the mobile communication provider may transmit the mapping information to the UE. For example, the first base station 10 may transmit the mapping information corresponding to the first mobile communication provider to the UE. The UE may store information regarding mapping between the third frequency resource and the first mobile communication provider, based on the mapping information.

In an embodiment of the disclosure, different mobile communication providers may be distinguished from each other through a sequence of synchronization signals without additionally using time and frequency resources to include an MNO ID in a synchronization signal.

In the LTE system and the NR system, a signal that a UE first receives to obtain synchronization information is a PSS and thus identification information of a mobile communication provider may need to be included in the PSS. In the LTE system and the NR system, three cases may be identified through a PSS. For example, among 1068 cell IDs, three cell ID groups each including 356 cell IDs may be identified through the PSS, and the 356 cell IDs included in each of the cell ID groups may be identified through an SSS. A PSS sequence may be generated using a Zadoff-Chu sequence in the case of the LTE system and generated using an M-sequence in the case of the NR system. However, the number of different PSS sequences that may be generated using the Zadoff-Chu sequence or the M-sequence may be three or more. In an embodiment of the disclosure, a mobile communication provider may be identified through a PSS sequence by increasing the number of different PSS sequences, which are to be generated using the Zadoff-Chu sequence or the M-sequence, to more than three and matching at least one added sequence to different mobile communication providers.

In an embodiment of the disclosure, a mobile communication provider may be identified through a PSS sequence by using values other than 25, 29, and 34, which are used in the related art, as a root index of the Zadoff-Chu sequence to add other types of PSS sequences and matching at least one added PSS sequence to different mobile communication identifiers. For example, a PSS sequence $d_u(n)$ may be determined by Equation 1 below.

$$d_u(n) = \begin{cases} e^{-j\frac{\pi un(n+1)}{63}} & n = 0, 1, \ldots, 30 \\ e^{-j\frac{\pi u(n+1)(n+2)}{63}} & n = 31, 32, \ldots, 61 \end{cases} \quad \text{Equation 1}$$

In Equation 1 above, u represents a root index, and 63 represents the length of a sequence.

When PSS sequences to be distinguished from each other are generated using the Zadoff-Chu sequence as shown in Equation 1 above, values relatively prime to 63 that is the length of the sequence should be used as the root index u. In the LTE system, three different PSS sequences may be generated using 25, 29, and 34 as the root index u. In an embodiment of the disclosure, a mobile communication provider may be identified through a PSS sequence by generating different PSS sequences by using, as the root index u, values other than 25, 29, and 34 among values that are relatively prime to 63, which is the sequence length, and matching the generated different PSS sequences or different root indices to different mobile communication providers. For example, the different root indices may be 17, 19, 20, 22, 23, 26 or the like but are not limited thereto.

In an embodiment of the disclosure, a mobile communication provider may be identified through a PSS sequence by adding other types of PSS sequence by modifying an M-sequence used for generating the PSS sequence and matching the added PSS sequences to different mobile communication identifiers. For example, the PSS sequence d(n) may be determined by Equations 2 and 3 below.

$$d(n)=1-2\times(m) \quad \text{Equation 2}$$

$$m=(n+43N_{ID}^{(2)}) \bmod 127 \quad \text{Equation 3}$$

In Equations 2 and 3 above, n is a natural number (0≤n<127) and $N_{ID}^{(2)} \in \{0, 1, 2\}$.

When PSS sequences distinguishable from each other are generated using the M-sequence as shown in Equations 2 and 3 above, 0≤m<127 and thus three different PSS sequences may be generated according to $N_{ID}^{(2)}$. In an embodiment of the disclosure, in Equation 3 above, "43" may be changed to another natural number k (0≤k<127) to generate PSS sequences different from three PSS sequences that may be generated using "43". Different PSS sequences may be generated by changing a set of values available as $N_{ID}^{(2)}$ to a set of natural numbers other than {0, 1, 2}, when necessary, in addition to the changing of "43" to the other natural number of k. Thereafter, a mobile communication provider may be identified through the PSS sequence by matching the generated different PSS sequences to different mobile communication providers.

For example, the first base station 10 may transmit, to a UE, the PSS, which is generated according to the above-described method of adding a PSS sequence, in the second frequency resource of the second mobile communication provider. The UE may identify that the PSS is a synchronization signal, for a communication service provided by the first mobile communication provider, by processing the received Zadoff-Chu sequence or M-sequence of the PSS.

Mapping information between the PSS sequence generated according to the above-described method of adding a PS sequence and the mobile communication provider may be required for the UE to identify the mobile communication provider through the PSS.

In an embodiment of the disclosure, the mapping information between the PSS sequence and the mobile communication provider may be previously stored in the UE. Alternatively, only mapping information corresponding to a mobile communication provider that provides a communication service to a UE may be stored in the UE. Alternatively, a base station of the mobile communication provider may transmit the mapping information to the UE. For example, the first base station 10 may transmit the mapping information corresponding to the first mobile communication provider to the UE. The UE may store information regarding mapping between the PSS sequence and the first mobile communication provider, based on the mapping information.

As described above, when different mobile communication providers are distinguishable from each other through a PSS sequence and a sequence of synchronization signals, a base station may not transmit an MNO ID to a UE by additionally allocating time and frequency resources. Therefore, time and frequency resources may be efficiently utilized.

Figure 10:
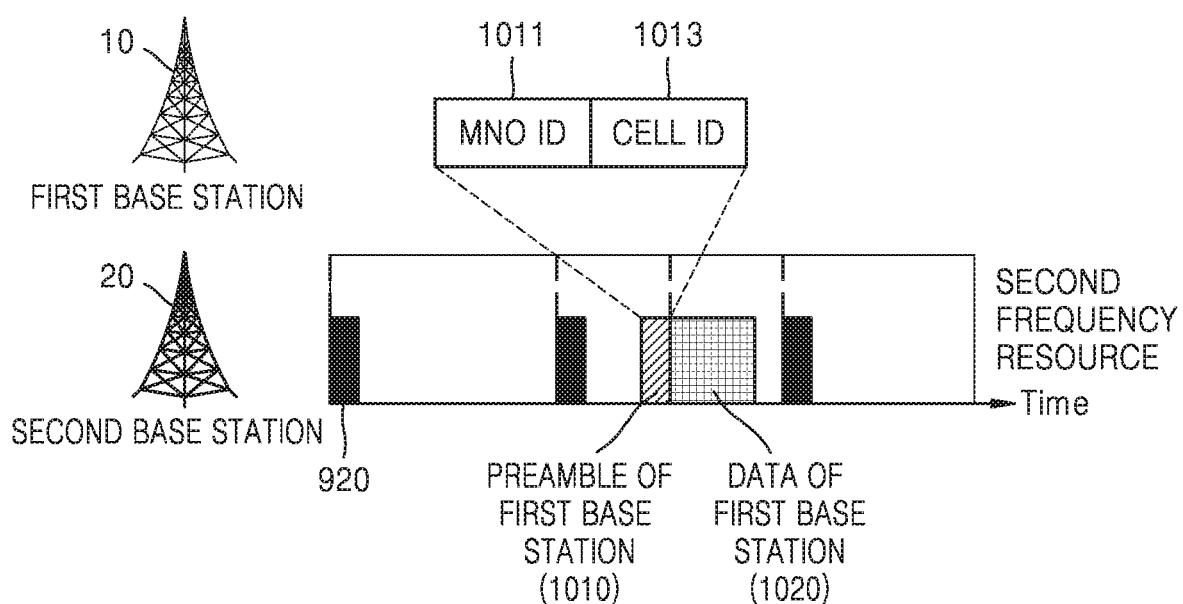
FIG. 10 is a diagram illustrating a method of transmitting synchronization information by using an aperiodic preamble, the method being performed by a base station according to an embodiment of the disclosure.

FIG. 10 is a diagram illustrating a method of transmitting synchronization information by using an aperiodic preamble, the method being performed by a base station according to an embodiment of the disclosure.

Referring to FIG. 10, in order to communicate with a UE by using a second frequency resource of a second mobile communication provider, a first base station 10 may transmit synchronous information to the UE by transmitting an aperiodic preamble 1010.

When the first base station 10 periodically transmits a synchronization signal by using the second frequency resource, available resources may reduce and thus this problem may be a burden in view of a second base station 20. Accordingly, according to an embodiment of the disclosure, the first base station 10 may transmit synchronization information to the UE by transmitting a preamble when transmitting data to the UE, instead of periodically transmitting a synchronization signal. For example, in order to transmit data 1020 to the UE, the first base station 10 may transmit synchronization information to the UE by transmitting the aperiodic preamble 1010 before transmitting the data 1020. When the first base station 10 transmits synchronization information to the UE through the aperiodic preamble 1010, the synchronization information may be transmitted only when there is data to be transmitted and thus the second frequency resource to be used by the second base station 20 may be prevented from being periodically occupied.

In an embodiment of the disclosure, the aperiodic preamble 1010 may include an MNO ID 1011 and a cell ID 1013 of a first mobile communication provider as the synchronization information of the first base station 10. Signals of base stations of two or more mobile communication providers may be transmitted through the second frequency resource. Accordingly, the UE may identify a signal transmitted from the first mobile communication provider by identifying the MNO ID 1011 included in the aperiodic preamble 1010.

In addition, when the first base station 10 transmits the synchronization information through the aperiodic preamble 1010 without periodically transmitting a synchronization signal, only the synchronization signal 920 may exist as a periodic synchronization signal transmitted through the second frequency resource. Therefore, the second synchronization signal 920 may not include an MNO ID for identifying the second mobile communication provider. The MNO ID is as described above with reference to FIGS. 8 and 9 and thus a detailed description thereof is omitted here.

The first base station 10 may transmit only the periodic synchronization signal 910 or the aperiodic preamble 1010 to communicate with the UE by using the second frequency resource or may transmit both the periodic synchronization signal 910 and the aperiodic preambles 1010.

Figure 11:
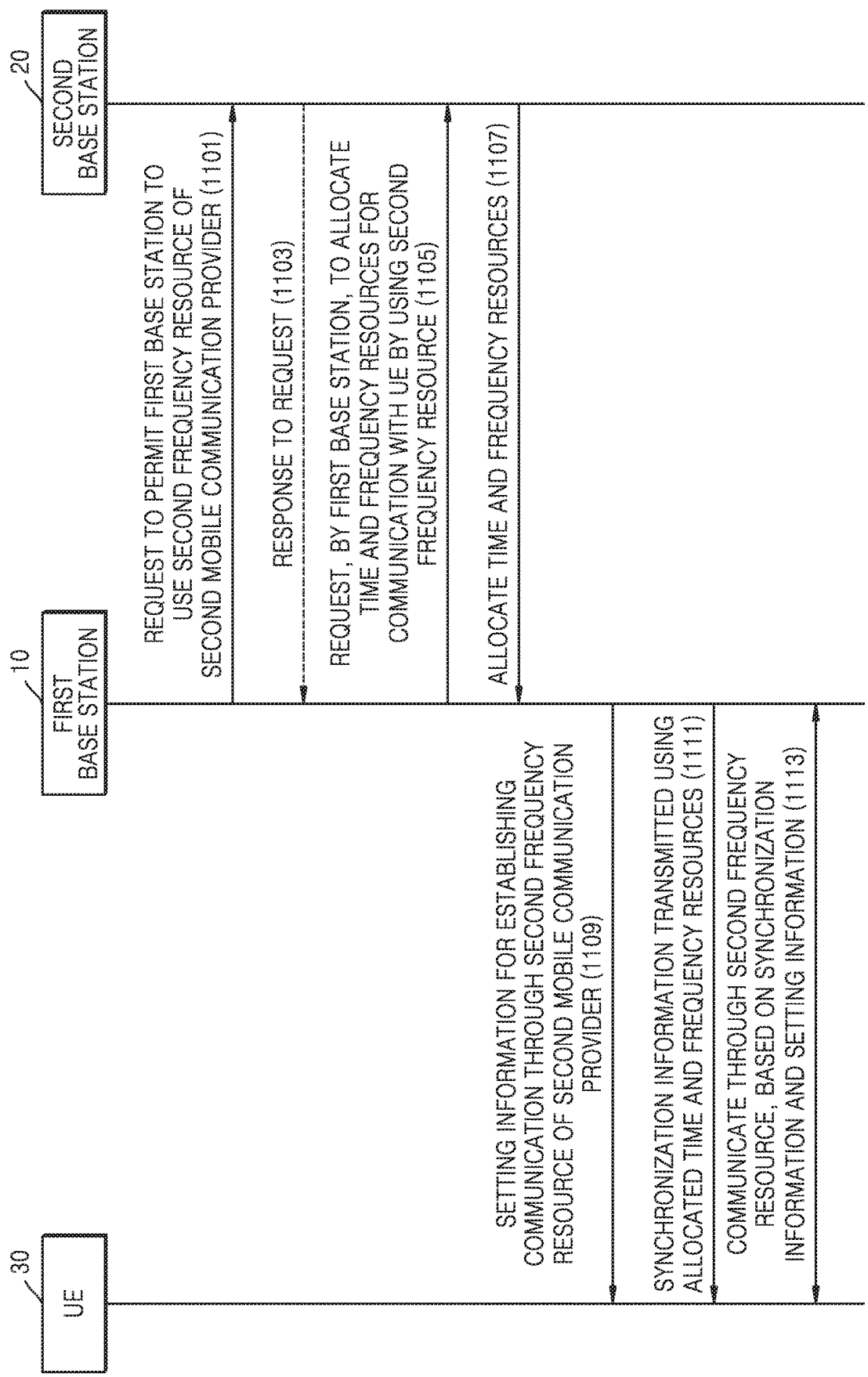
FIG. 11 is a diagram illustrating a method in which a first base station of a first mobile communication provider is allocated a resource to communicate with a UE by using a second frequency resource of a second mobile communication provider according to an embodiment of the disclosure.

FIG. 11 is a diagram illustrating a method in which a first base station of a first mobile communication provider is allocated a resource to communicate with a UE by using second frequency resource of a second mobile communication provider according to an embodiment of the disclosure.

Referring to FIG. 11, in operation 1101, a first base station 10 may request a second base station 20 to permit the first base station 10 to use a second frequency resource of a second mobile communication provider.

For example, the first base station 10 may request the second base station 20 to permit use of the second frequency resource in case of saturation of a frequency resource of the first mobile communication provider or when the amount of allocated frequency resource exceeds a certain threshold. The request to permit use of the second frequency resource may include identification information of the first mobile communication provider managing the first base station 10 or information requesting to allocate the identification information of the first mobile communication provider.

In operation 1103, the first base station 10 may receive a response to the request from the second base station 20.

In an embodiment of the disclosure, the second base station 20 may determine whether to permit the first base station 10 to use the second frequency resource, based on an occupancy state of the second frequency resource. For example, the second base station 20 may not permit the first base station 10 to use the second frequency resource in case of saturation of the second frequency resource or when the amount of allocated frequency resource exceeds a certain threshold. The second base station 20 may permit the first base station 10 to use the second frequency resource when a size of a region occupied by or to be occupied by the second frequency resource is equal to or less than that of a predetermined region. The second base station 20 may transmit a response to the request to the first base station 10. For example, the second base station 20 may transmit to the first base station 10 a message informing that use of the second frequency resource is permitted or not permitted. The second base station 20 may transmit an ACK when the first base station 10 is permitted to use the second frequency resource, and transmit a NACK when the first base station 10 is not permitted to use the second frequency resource.

Alternatively, the second base station 20 may transmit an ACK or a NACK informing that the request from the first base station 10 has been successfully received without determining whether to permit the request from the first base station 10.

Operation 1103 may be omitted. For example, the second base station 20 may not transmit a response to the first base station 10 when the second base station 20 successfully receives the request from the first base station 10 or when the second base station 20 permits the first base station 10 to use the second frequency resource.

In operation 1105, the first base station 10 may request the second base station 20 to allocate time and frequency resources for the first base station 10 to communicate with the UE by using the second frequency resource. The request to allocate time and frequency resources may include a request to allocate time and frequency resources for the first base station 10 to transmit synchronization information, and a request to allocate time and frequency resources for transmitting control information and data.

In an embodiment of the disclosure, the first base station 10 may receive a response to the request to permit use of the second frequency resource from the second base station 20 and thereafter transmit a request to allocate time and frequency resources to the second base station 20, based on the received response. Alternatively, the first base station 10 may request the second base station 20 to allocate time and frequency resources without receiving a response from the second base station 20.

In operation 1107, the first base station 10 may be allocated the time and frequency resources from the second base station 20.

In an embodiment of the disclosure, the second base station 20 may allocate the time and frequency resources to the first base station 10, based on an occupancy state of the second frequency resource. The second base station 20 may allocate, to the first base station 10, time and frequency resources that are not scheduled for the second frequency resource.

In operation 1109, the first base station 10 may transmit, to a UE 30, setting information for establishing communication through the second frequency resource of the second mobile communication provider.

In an embodiment of the disclosure, the setting information may include information about a method for the UE 30 to obtain synchronization information corresponding to the first base station 10 in the second frequency resource. In addition, the setting information may include information about the time and frequency resources allocated to the first base station 10 by the second base station 20. The setting information may include information about time and frequency resources allocated to the first base station 10 so as to transmit the synchronization information by using the second frequency resource.

In operation 1111, the first base station 10 may transmit the synchronization information to the UE 30 by using the allocated time and frequency resources. The first base station 10 may transmit the synchronization information to the UE 30 by transmitting a periodic synchronization signal or an aperiodic preamble by using the allocated time and frequency resources.

In operation 1113, the first base station 10 may communicate with the UE 30 through the second frequency resource, based on the synchronization information and the setting information. The UE 30 may transmit or receive control information or data by using the second frequency resource, based on the synchronization information received from the first base station 10.

Details of operations 1101, 1109, and 1113 may correspond to those of operations 710, 720, and 730 described above with reference to FIG. 7.

Figure 12:
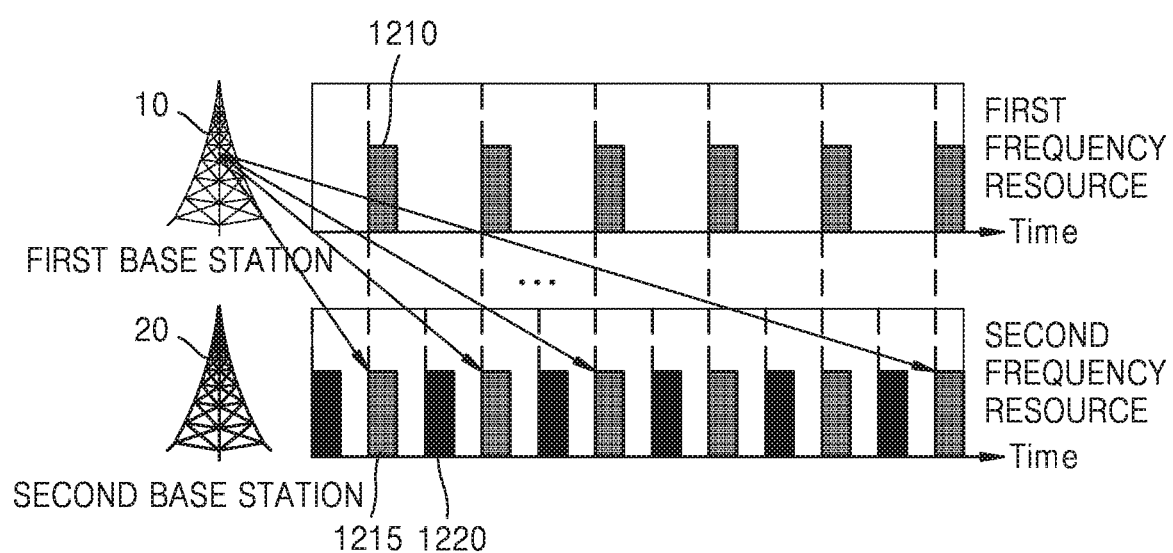
FIG. 12 is a diagram illustrating a method of communicating with a UE by using a resource preferred by a first base station of a first mobile communication provider in a resource of a second mobile communication provider, the method being performed by the first base station according to an embodiment of the disclosure.

FIG. 12 is a diagram illustrating a method of communicating with a UE by using a resource preferred by the first base station in a resource of a second mobile communication provider, the method being performed by a first base station of a first mobile communication provider, according to an embodiment of the disclosure.

In an embodiment of the disclosure, a first base station 10 may transmit information about a resource preferred by the first base station 10 while requesting a second base station 20 to permit use of a second frequency resource. The resource preferred by the first base station 10 may include at least one resource region and information about preference for each resource region. The second base station 20 may allocate a resource to the first base station 10, based on the information about the resource preferred by the first base station 10.

Referring to FIG. 12, a UE may easily obtain synchronization information when the first base station 10 transmits a first synchronization signal 1210 in a first frequency resource and a third synchronization signal 1215 in a second frequency resource through the same time resource. For example, the first base station 10 may transmit the third synchronization signal 1215 by using the same time resource as the first synchronization signal 1210 in the first frequency resource that is already being transmitted to the UE, and thus, a time resource for transmission of the synchronization signal 1215 may not be determined additionally. In addition, in order to receive the third synchronization signal 1215, the UE may not search the second frequency resource for a time resource different from the time resource in which the first synchronization signal 1210 is transmitted.

Accordingly, in an embodiment of the disclosure, the first base station 10 may transmit, to the second base station 20, information indicating that the first base station 10 prefers to transmission of the third synchronization signal 1215 through a time resource the same as that in which the first synchronization signal 1210 is transmitted.

The second base station 20 may determine whether to permit the first base station 10 to use the preferred resource, based on the preference of the first base station 10. For example, the second base station 20 may permit the first base station 10 to transmit the third synchronization signal 1215 through the time resource in which the first synchronization signal 1210 is transmitted, when the time resource in which the first synchronization signal 1210 is transmitted does not overlap a time resource in which the second synchronization signal 1220 of the second base station is transmitted. When the time resource in which the first synchronization signal 1210 is transmitted partially overlaps the time resource in which the second synchronization signal 1220 of the second base station is transmitted, the second base station 20 may allocate a resource such that the first synchronization signal 1210 is transmitted in a frequency resource different from a frequency resource in which the second synchronization signal 1220 is transmitted.

Figure 13:
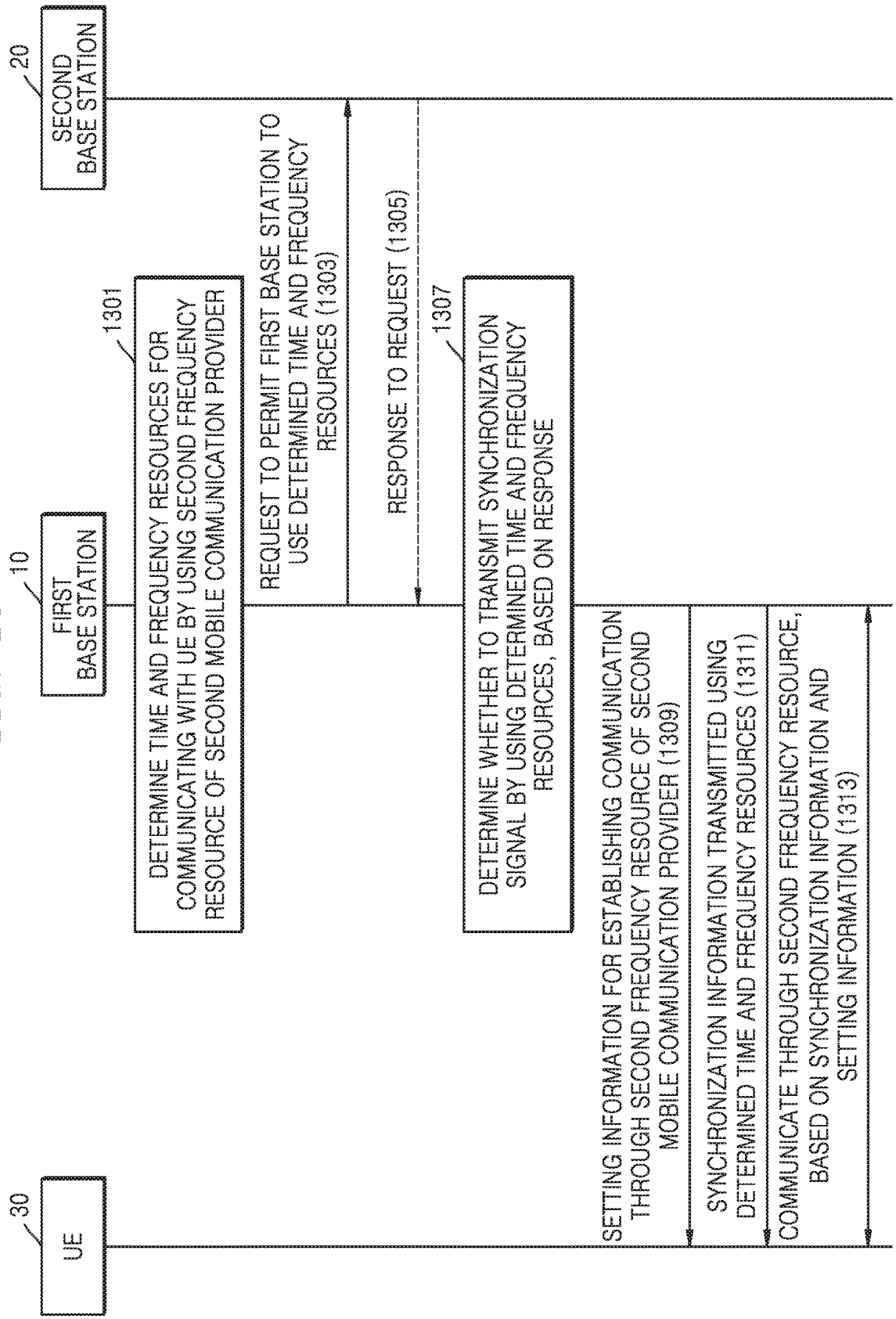
FIG. 13 is a diagram illustrating a method of communicating with a UE by using a resource determined by a first base station of a first mobile communication provider in a resource of a second mobile communication provider, the method being performed by the first base station according to an embodiment of the disclosure.

FIG. 13 is a diagram illustrating a method of communicating with a UE by using a resource determined by a first base station of a first mobile communication provider in a resource of a second mobile communication provider, the method being performed by the first base station according to an embodiment of the disclosure.

Referring to FIG. 13, in operation 1301, a first base station 10 may determine time and frequency resources for communicating with a UE 30 by using a second frequency resource of a second mobile communication provider.

In an embodiment of the disclosure, the first base station 10 may consider communication using the second frequency resource of the second mobile communication provider in case of saturation of a frequency resource of the first mobile communication provider or when the amount of allocated frequency resource exceeds a certain threshold.

As described above with reference to FIG. 11, the first base station 10 may be allocated time and frequency resources from the second base station 20 to communicate with the UE 30 by using the second frequency resource. In an embodiment of the disclosure, the first base station 10 may determine time and frequency resources for communication using the second frequency resource.

In an embodiment of the disclosure, the first base station 10 may detect an occupancy state of the second frequency resource, and determine time and frequency resources for communicating with the UE 30 among unoccupied time and frequency resources. The first base station 10 may determine not to use the second frequency resource when the occupancy state of the second frequency resource is a saturation state or an occupied region is greater than a predetermined rate.

In an embodiment of the disclosure, the first base station 10 may determine time and frequency resources for transmission of synchronization information to the UE 30 by using the second frequency resource. The first base station 10 may determine time and frequency resources for transmission of a periodic synchronization signal or an aperiodic preamble by using the second frequency resource.

In an embodiment of the disclosure, the first base station 10 may determine that the synchronization information is to be transmitted using at least one of the periodic synchronization signal or the aperiodic preamble, based on the occupancy state of the second frequency resource. For example, the first base station 10 may determine to transmit the aperiodic preamble instead of the periodic synchronization signal when the occupancy state of the second frequency resource is greater than the predetermined rate. The first base station 10 may determine to transmit both the periodic synchronization signal and the aperiodic preamble when the occupancy state of the second frequency resource is less than or equal to the predetermined rate.

In operation 1303, the first base station 10 may request the second base station 20 to permit the first base station 10 to use the determined time and frequency resources.

In operation 1305, the first base station 10 may receive a response to the request from the second base station 20. The second base station 20 may determine whether to permit the first base station 10 to use the time and frequency resources determined by the first base station 10. Operation 1305 may be omitted.

In operation 1307, the first base station 10 may determine whether to transmit the synchronization signal by using the determined time and frequency resources, based on the received response.

In an embodiment of the disclosure, the first base station 10 may determine to transmit the synchronization signal by using the determined time and frequency resources when the first base station 10 receives an ACK from the second base station 20 in response to the request or when the first base station 10 receives a response informing that the first base station 10 is permitted to use the determine time and frequency resources.

Operation 1307 may be omitted. In an embodiment of the disclosure, the first base station 10 may transmit the synchronization information to the UE 30 by using the time and frequency resources determined in operation 1301 without receiving a response from the second base station 20. Alternatively, the first base station 10 may determine to transmit the synchronization information to the UE 30, based on a certain condition, even when the first base station 10 receives a NACK from the second base station 20 or receives a response informing that use of the time and frequency resources determined in operation 1301 is not permitted. For example, this condition may include a case in which the first base station 10 determines that communication between the first base station 10 and the UE 30 is urgent.

In operation 1309, the first base station 10 may transmit, to the UE 30, setting information for establishing communication through the second frequency resource of the second mobile communication provider. The setting information may include information about the time and frequency resources that are determined by the first base station 10 to be used for communication with the UE 30 by using the second frequency resource. In addition, the setting information may include information about the time and frequency resources determined by the first base station 10 to transmit the synchronization information by using the second frequency resource.

In operation 1311, the first base station 10 may transmit the synchronization information to the UE 30 by using the determined time and frequency resources. The first base station 10 may transmit the synchronization information to the UE 30 by transmitting a periodic synchronization signal or an aperiodic preamble by using the allocated time and frequency resources.

In operation 1113, the first base station 10 may communicate with the UE 30 through the second frequency resource, based on the synchronization information and the setting information. The UE 30 may transmit or receive control information or data by using the second frequency resource, based on the synchronization information received from the first base station 10.

Details of operations 1303, 1309, and 1313 may correspond to those of operations 710, 720, and 730 described above with reference to FIG. 7. Details of operation 1305 may correspond to those of operation 1103 described above with reference to FIG. 11.

FIG. 14 is a diagram illustrating a method of instructing a resource region to be monitored by a UE to receive a synchronization signal, the method being performed by a first base station, according to an embodiment of the disclosure.

When a first base station 10 transmits synchronization information, for communication using a second frequency resource, to a UE 30 through an aperiodic preamble, the first base station 10 may transmit, to the UE 30, information about time and frequency resources in which the aperiodic preamble is to be transmitted. The information about the time and frequency resources in which the aperiodic preamble is to be transmitted may be included in setting information transmitted by the first base station 10 to the UE 30. In an embodiment of the disclosure, the first base station 10 may transmit information about time and frequency resources that the UE 30 should detect to receive the aperiodic preamble.

Referring to 1401 of FIG. 14, the first base station 10 may transmit, to the UE 30, information about a preamble reception window 1410 for the UE 30 to attempt to receive the aperiodic preamble. The preamble reception window 1410 may refer to a time period in which the UE 30 receives a signal transmitted in a second frequency resource region and searches for the aperiodic preamble so as to receive the aperiodic preamble of the first base station 10. The UE 30 may attempt to receive the aperiodic preamble of the first base station 10 through the second frequency resource during the preamble reception window 1410. Alternatively, the first base station 10 may set one or more preamble reception windows and transmit information about the set one or more preamble reception windows to the UE 30. For example, the UE 30 may attempt to receive an aperiodic preamble of the first base station 10, based on a plurality of preamble reception windows.

Referring to 1402 of FIG. 14, the first base station 10 may transmit information about a reception attempt period and information about a continuous reception attempt time to the UE 30, so that the UE 30 may attempt to receive the aperiodic preamble through the second frequency resource. The continuous reception attempt time may refer to a duration during which a signal transmitted in the second frequency resource region is received and the aperiodic preamble is searched for, when the UE 30 attempts to receive the aperiodic preamble once. The UE 30 may blindly detect (1420) the aperiodic preamble of the first base station 10, based on the reception attempt period and the continuous reception attempt time (1402).

In an embodiment of the disclosure, the first base station 10 may adjust the length of the aperiodic preamble reception window, the number of times of retransmission, and the like based on the preamble reception window 1410 or the reception attempt period and the continuous reception attempt time of the UE 30, so that a possibility that the UE 30 will receive the aperiodic preamble may be increased.

Figure 15:
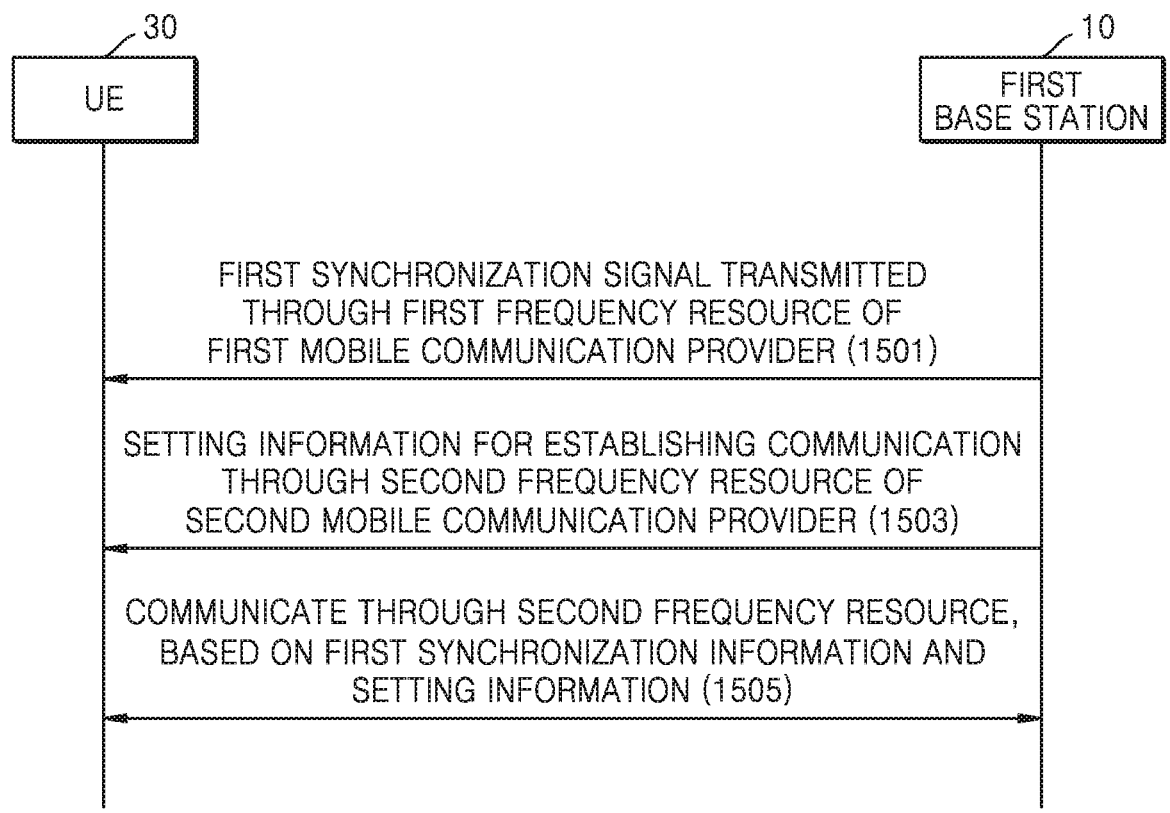
FIG. 15 is a flowchart of a method of synchronizing a UE with a first base station, for communication using a resource of a second mobile communication provider, through a first synchronization signal transmitted in a first frequency resource of a first mobile communication provider according to an embodiment of the disclosure.

FIG. 15 is a flowchart of a method of synchronizing a UE with a first base station, for communication using a resource of a second mobile communication provider, through a first synchronization signal transmitted in a first frequency resource of a first mobile communication provider according to an embodiment of the disclosure.

Referring to FIG. 15, in operation 1501, a first base station 10 may transmit a first synchronization signal to a UE 30 through a first frequency resource of a first mobile communication provider. The first synchronization signal refers to a synchronization signal of the first base station 10 in the first frequency resource. The first synchronization signal may be transmitted regardless of whether the first base station 10 uses the second frequency resource of the second mobile communication provider.

In operation 1503, the first base station 10 may transmit, to the UE 30, setting information for establishing communication through the second frequency resource of the second mobile communication provider.

Details of operation 1305 may correspond to those of operation 720 described above with reference to FIG. 7. Therefore, the above description of operation 720 of FIG. 7 is omitted in describing operation 1503.

Figure 16:
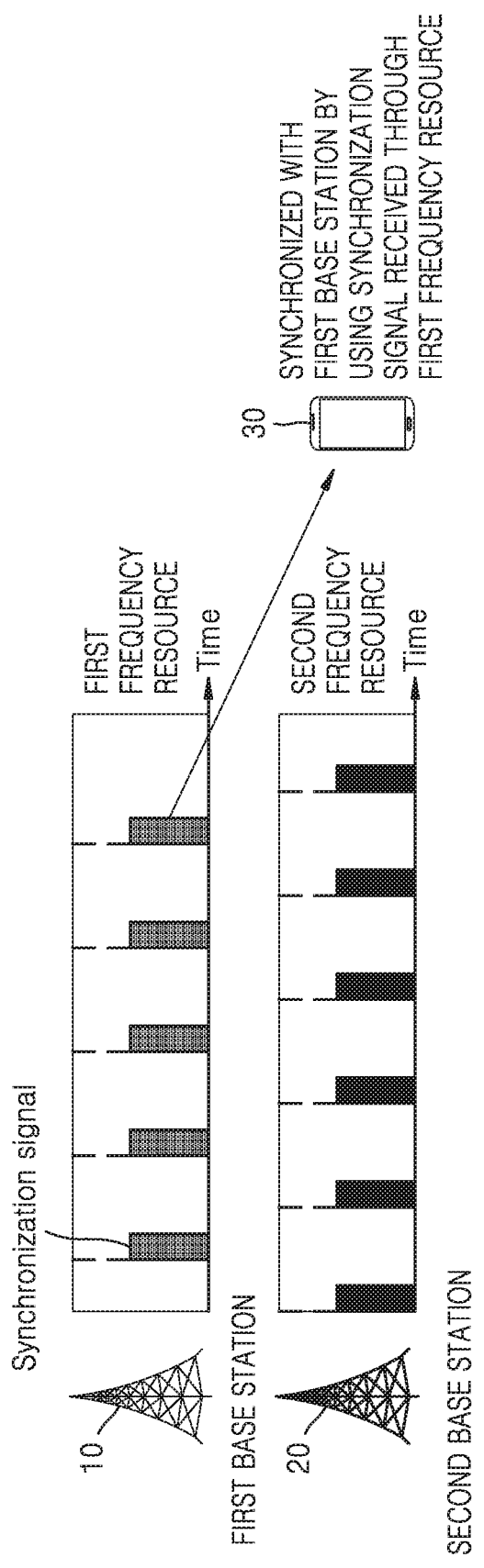
FIG. 16 is a diagram illustrating a method of synchronizing a UE with a first base station, for communication using a resource of a second mobile communication provider, through a first synchronization signal transmitted in a first frequency resource of a first mobile communication provider according to an embodiment of the disclosure.

FIG. 16 is a diagram illustrating a method of synchronizing a UE with a first base station, for communication using a resource of a second mobile communication provider, through a first synchronization signal transmitted in a first frequency resource of a first mobile communication provider, according to an embodiment of the disclosure.

Referring to FIG. 16, however, because frequency resources are independent and synchronization may be independently performed therethrough, synchronization information with respect to each of the frequency resources may be different. Accordingly, as described above, the first base station 10 may transmit the synchronization information of the first base station 10 through the second frequency resource to communicate with the UE 30 by using the second frequency resource.

However, in an embodiment of the disclosure, the first base station 10 may transmit the synchronization information of the first base station 10 in the second frequency resource through the first frequency resource. For example, as illustrated in FIG. 16, the first base station 10 may communicate with the UE 30 through the second frequency resource, based on the first synchronization signal, and may not additionally transmit a synchronization signal other than the first synchronization signal to the UE 30.

A condition under which the first base station 10 transmits the synchronization information of the first base station 10 in the second frequency resource through the first frequency resource may be variously determined. For example, when the first frequency resource and the second frequency resource are bands adjacent to each other, the first base station 10 may transmit the synchronization information of the first base station 10 in the second frequency resource through the first frequency resource. However, the condition is not limited to the above example.

Setting information for establishing communication through the second frequency resource may include information about a method of obtaining the synchronization information corresponding to the first base station 10 in the second frequency resource, the method being performed by the UE 30. For example, the setting information may include information which is set by the UE 30 to obtain the synchronization information of the first base station 10 in the second frequency resource by receiving the first synchronization signal.

In an embodiment of the disclosure, each frequency resource is independent, and thus, transmission/reception timing of a signal by the first base station 10 in the second frequency resource according to the first synchronization signal transmitted through the first frequency resource may be different from that of a signal actually transmitted by the first base station 10 through the second frequency resource. Accordingly, the first base station 10 may transmit, to the UE 30, offset information regarding the difference between timing of an operation through the second frequency resource according to the first synchronization signal and timing of an actual operation through the second frequency resource. The offset information may be included in the setting information for establishing communication through the second frequency resource. The UE 30 may obtain the synchronization information of the first base station 10 in the second frequency resource, based on the first synchronization signal and the offset information.

In operation 1505, the first base station 10 may communicate with the UE 30 through the second frequency resource, based on the first synchronization signal and the setting information. The UE 30 may transmit control information or data to or receive control information or data from the first base station 10, based on the first synchronization signal received through the first frequency resource according to the setting information. For example, the UE 30 may communicate with the first base station 10, based on the synchronization information of the first base station 10 in the second frequency resource, which is obtained based on the first synchronization signal and the offset information.

In an embodiment of the disclosure, the first base station 10 may transmit a fourth synchronization signal including the synchronization information of the first base station 10 in the second frequency resource by using the first frequency resource of the first base station 10. Alternatively, the setting information may include information which is set by a UE to obtain the synchronization information of the first base station 10 in the second frequency resource by receiving the fourth synchronization signal. The setting information may include the offset information. The UE 30 may communicate with the first base station 10, based on the fourth synchronization signal and the setting information.

Figure 17:
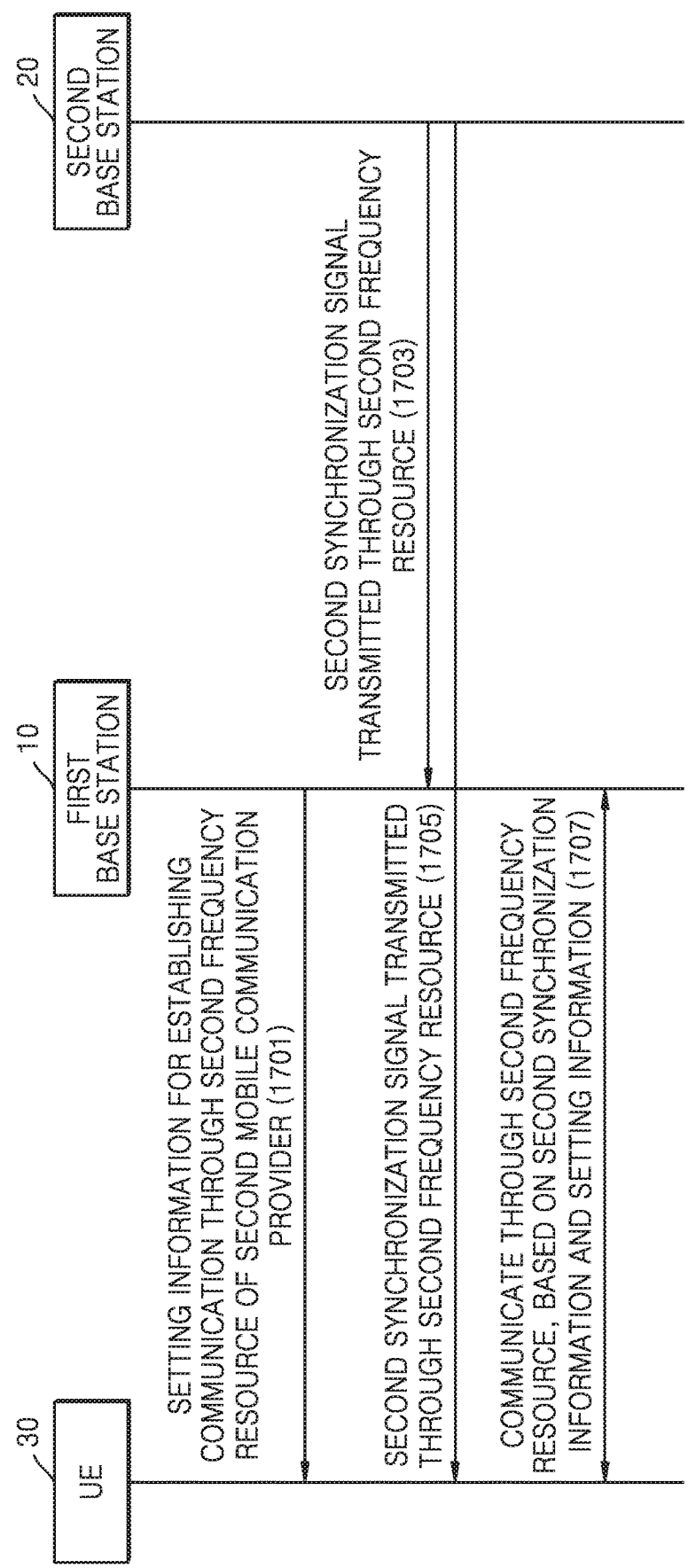
FIG. 17 is a diagram illustrating a method of synchronizing a UE with a first base station, for communication using a resource of a second mobile communication provider, through a second synchronization signal transmitted from a second base station according to an embodiment of the disclosure.

FIG. 17 is a diagram illustrating a method of synchronizing a UE with a first base station, for communication using a resource of a second mobile communication provider, through a second synchronization signal transmitted from a second base station according to an embodiment of the disclosure.

Referring to FIG. 17, in operation 1701, a first base station 10 may transmit, to a UE 30, setting information for establishing communication through a second frequency resource of a second mobile communication provider.

Details of operation 1701 may correspond to those of operation 720 described above with reference to FIG. 7. Therefore, the above description of operation 720 of FIG. 7 is omitted in describing operation 1701.

Figure 18:
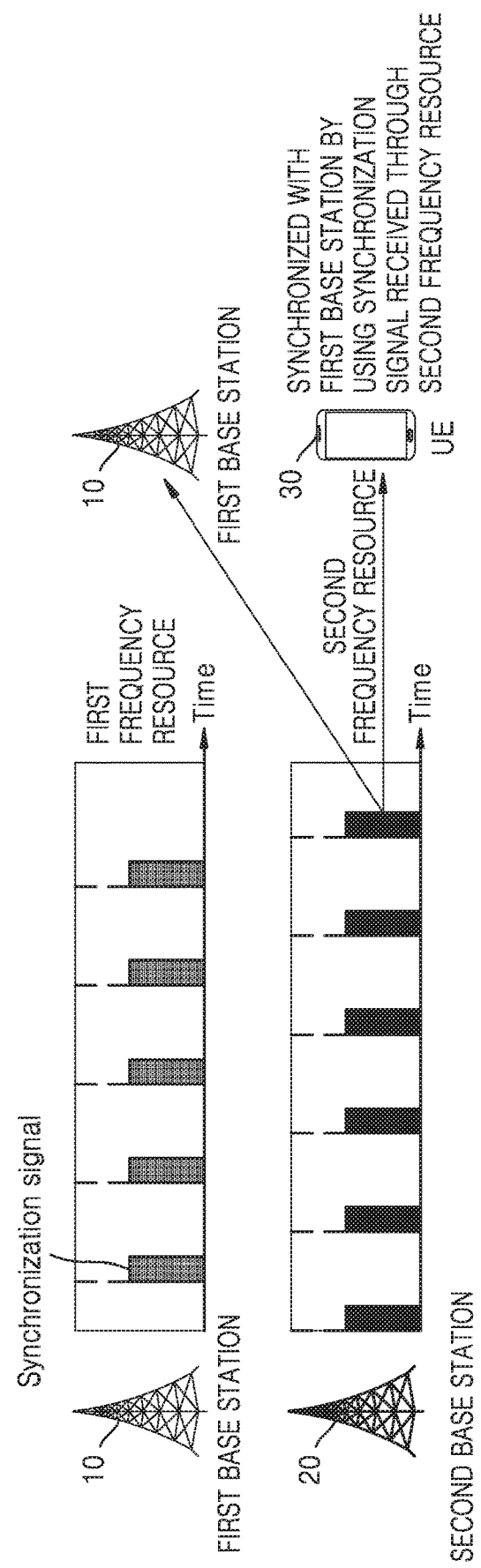
FIG. 18 is a diagram illustrating a method of synchronizing a UE with a first base station, for communication using a resource of a second mobile communication provider, through a second synchronization signal transmitted from the second mobile communication provider according to an embodiment of the disclosure.

FIG. 18 is a diagram illustrating a method of synchronizing a UE with a first base station, for communication using a resource of a second mobile communication provider, through a second synchronization signal transmitted from the second mobile communication provider, according to an embodiment of the disclosure.

Referring to FIG. 18, in an embodiment of the disclosure, the first base station 10 may configure the UE 30 to receive a second synchronization signal of a second base station 20 transmitted through the second frequency resource so as to obtain synchronization information of the first base station 10. For example, the first base station 10 may not transmit an additional synchronization signal to communicate with the UE 30 through the second frequency resource. As illustrated in FIG. 18, the UE 30 may be synchronized with the first base station 10 by using the second synchronization signal of the second base station 20 received through the second frequency resource.

A condition under which the first base station 10 communicates with the UE 30 based on the second synchronization signal may be variously determined. For example, when the second base station 20 transmits the second synchronization signal but does not transmit data, the first base station 10 may be synchronized with the UE 30 and transmit or receive control information or data through the second synchronization signal. However, the condition is not limited to the above example.

The first base station 10 may receive the second synchronization signal transmitted by the second base station 20 to communicate with the UE 30, based on the second synchronization signal. In addition, the first base station 10 may obtain synchronization information of the second base station 20 from the second base station 20 or a second mobile communication provider. The first base station 10 may receive information about the second synchronization signal, such as transmission timing, a transmission period, or a continuous transmission time, of the second synchronization information, based on the received second synchronization signal or the obtained synchronization information of the second base station 20. The first base station 10 may transmit control information or data to or receive control information or data from the UE 30, based on the received second synchronization signal or the obtained synchronization information of the second base station 20.

Setting information for establishing communication through the second frequency resource may include information about a method of obtaining the synchronization information corresponding to the first base station 10 in the second frequency resource, the method being performed by the UE 30. For example, the setting information may include information which is set by the UE 30 to obtain the synchronization information of the first base station 10 in the second frequency resource by receiving the second synchronization signal. In addition, the setting information may include information about the second synchronization signal. For example, the setting information may include information about the transmission timing and information about a transmission period of the second synchronization signal.

In an embodiment of the disclosure, each frequency resource is independent, and thus, transmission/reception timing of a signal by the first base station 10 in the second frequency resource according to the second synchronization signal transmitted through the second frequency resource may be different from that of a signal actually transmitted by the first base station 10 through the second frequency resource. Accordingly, the first base station 10 may transmit, to the UE 30, offset information regarding the difference between timing of an operation through the second frequency resource according to the second synchronization signal and timing of an actual operation through the second frequency resource. The offset information may be included in the setting information for establishing communication through the second frequency resource. The UE 30 may obtain the synchronization information of the first base station 10 in the second frequency resource, based on the second synchronization signal and the offset information.

In operation 1703, the first base station 10 may receive the second synchronization signal corresponding to the second base station 20 from the second base station 20 through the second frequency resource. In operation 1705, the UE 30 may receive the second synchronization signal from the second base station 20 through the second frequency resource. The second synchronization signal may be transmitted regardless of whether the first base station 10 uses the second frequency resource of the second mobile communication provider.

The first base station 10 and the UE 30 may be synchronize with each other in real time through communicating based on the second synchronization signal continuously received from the second base station 20.

In operation 1707, the first base station 10 may communicate with the UE 30 through the second frequency resource, based on the second synchronization information and the setting information.

The UE 30 may transmit control information or data to or receive control information or data from the first base station 10 through the second frequency resource, based on the second synchronization signal received based on the setting information. For example, the UE 30 may communicate with the first base station 10, based on the synchronization information of the first base station 10 in the second frequency resource, which is obtained based on the second synchronization signal and the offset information.

Figure 19:
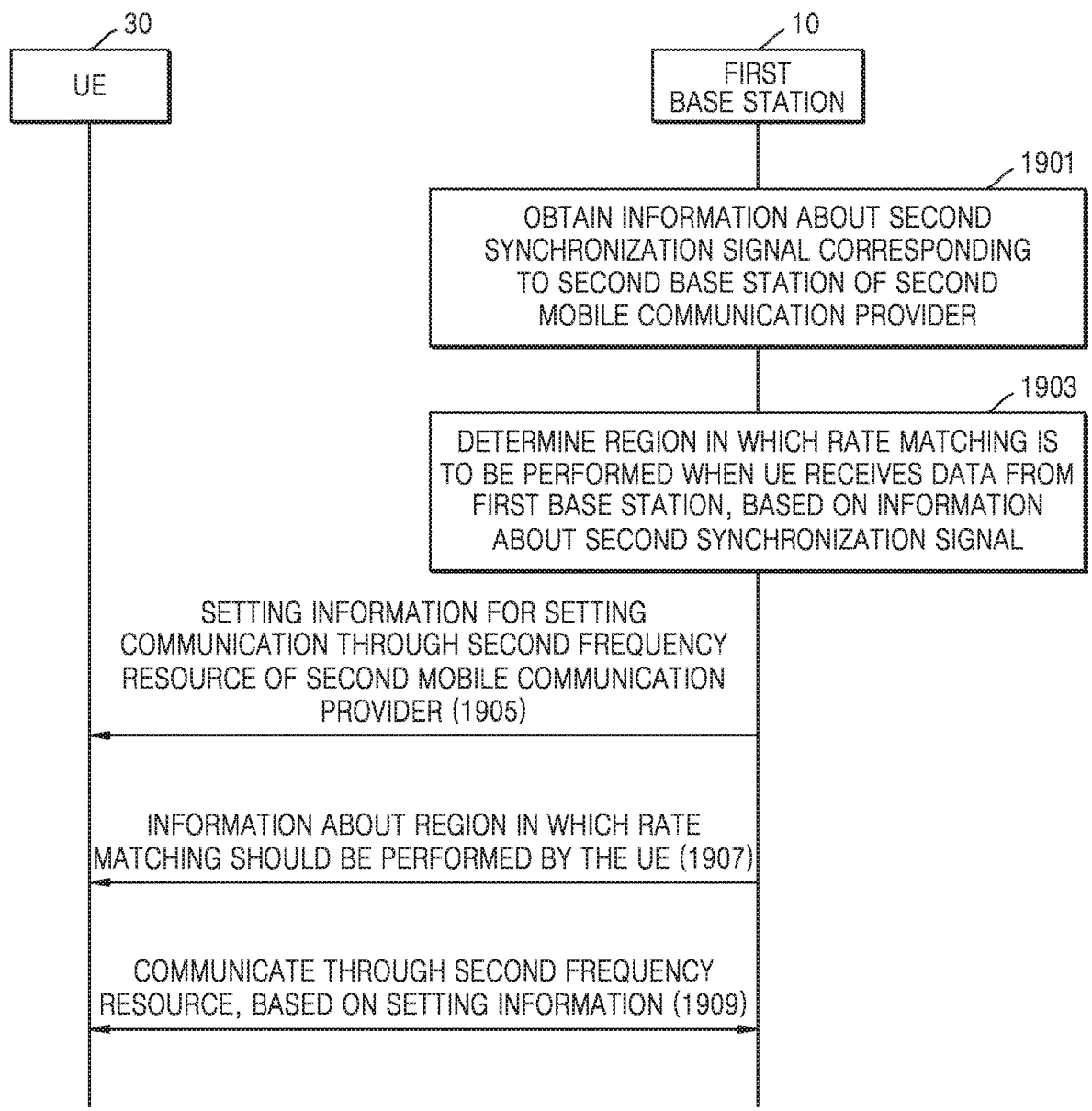
FIG. 19 is a flowchart of a method of instructing a region in which rate matching is to be performed by a UE, the method being performed by a first base station according to an embodiment of the disclosure.

FIG. 19 is a flowchart of a method of instructing a region in which rate matching is to be performed by a UE, the method being performed by a first base station according to an embodiment of the disclosure.

Referring to FIG. 19, in operation 1901, a first base station 10 may obtain information about a second synchronization signal corresponding to the second base station 20 of the second mobile communication provider.

In an embodiment of the disclosure, the first base station 10 may receive the second synchronization signal transmitted by the second base station 20. In addition, the first base station 10 may obtain synchronization information of the second base station 20 from the second base station 20 or the second mobile communication provider. The first base station 10 may receive information about the second synchronization signal, such as transmission timing, a transmission period, or a continuous transmission time, of the second synchronization information, based on the received second synchronization signal or the obtained synchronization information of the second base station 20.

In operation 1903, the first base station 10 may determine a region in which rate matching is to be performed by the UE 30 when the UE 30 receives data from the first base station 10, based on the information about the second synchronization signal.

The second frequency resource is a resource managed by the second mobile communication provider, and a signal received by the UE 30 through the second frequency resource may include the second synchronization signal of the second base station 20. Therefore, when the UE 30 performs rate matching related to a signal received through the second frequency resource, rate matching may be smoothly performed on a signal received from the first base station 10 when rate matching is performed on a resource region excluding the second synchronization signal. When rate matching is smoothly performed, a probability that the signal transmitted by the first base station 10 will be received by the UE 30 may increase.

Figure 20:
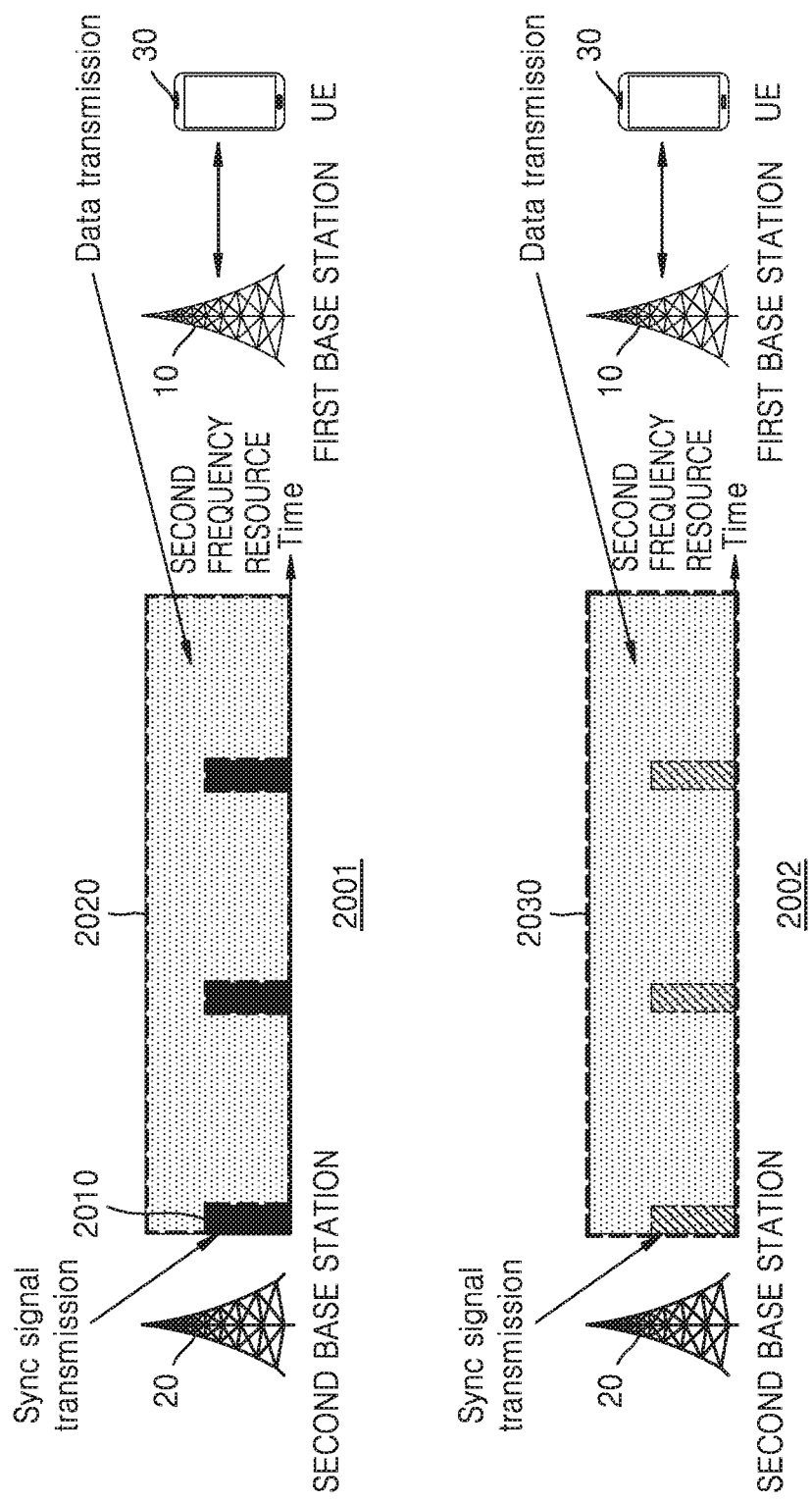
FIG. 20 is a diagram illustrating a method of performing rate matching by a UE according to an embodiment of the disclosure.

FIG. 20 is a diagram illustrating a method of performing rate matching by a UE, according to an embodiment of the disclosure.

Referring to FIG. 20, in an embodiment of the disclosure, the first base station 10 may determine to exclude a region in which the second synchronization signal is located from the region for which the UE 30 performs rate matching, based on the information on the second synchronization signal obtained in operation 1901. Referring to 2001 of FIG. 20, the first base station 10 may determine that rate matching is to be performed by the UE 30 on a remaining region, excluding a second synchronization signal 2010, of a resource region 2020 of a signal received by the UE 30 through the second frequency resource.

In addition, the second base station 20 may variably adjust a period of the second synchronization signal according to a purpose of reducing signaling overhead or the like. In an embodiment of the disclosure, when a period of the second synchronization signal is variable, the first base station 10 may determine to exclude the region in which the second synchronization signal is located from the region in which the UE 30 performs rate matching, according to a shortest period among periods of the second synchronization signal identified by the first base station 10, based on the obtained synchronization information of the second base station 20.

In an embodiment of the disclosure, the first base station 10 may determine that rate matching is to be performed by the UE 30 without considering the second synchronization signal under a certain condition. For example, the condition may include a case in which it is not easy for the first base station 10 or the UE 30 to identify the information about the second synchronization signal 2010. When it is not easy to identify the information about the second synchronization signal 2010, the first base station 10 and the UE 30 may transmit or receive control information and data without considering the second synchronization signal. Referring to 2002 of FIG. 20, the first base station 10 may determine that rate matching is to be performed by the UE 30 on an entire resource region 2030 of a signal received by the UE 30 through the second frequency resource without considering the second synchronization signal 2010 in the resource region 2030.

In operation 1905, the first base station 10 may transmit, to the UE 30, setting information for establishing communication through the second frequency resource of the second mobile communication provider.

Details of operation 1905 may correspond to those of operation 720 described above with reference to FIG. 7. Therefore, the above description of operation 720 of FIG. 7 is omitted in describing operation 1905.

According to an embodiment of the disclosure, the setting information for establishing communication through the second frequency resource may include information about a region in which rate matching is to be performed when the UE 30 receives data from the first base station 10. In addition, the setting information may include information related to the second synchronization signal.

In operation 1907, the first base station 10 may transmit, to the UE 30, information about the region in which rate matching is to be performed by the UE 30. The information about the region in which rate matching is to be performed by the UE 30 may be transmitted separately from the setting information transmitted in operation 1905 or may be transmitted in the setting information.

In operation 1909, the UE 30 and the first base station 10 may communicate with each other through the second frequency resource, based on the setting information.

The UE 30 may transmit control information or data to or receive control information or data from the first base station 10 through the second frequency resource, based on the second synchronization signal received based on the setting information. In addition, the UE 30 may perform rate matching on a signal received by the UE 30, based on the setting information and the information about the region in which rate matching is to be performed.

In an embodiment of the disclosure, the UE 30 may identify the information about the second synchronization signal without receiving, from the first base station 10, the information about the second synchronization signal or the information about the region in which rate matching is to be performed. The UE 30 may identify transmission timing, a transmission period, and a continuous transmission time of the second synchronization signal by receiving the second synchronization signal from the second base station 20. The UE 30 may perform rate matching on a signal received from the first base station 10 through the second frequency resource, based on the information about the second synchronization signal identified by the UE 30.

A method of sharing a frequency resource of the first mobile communication provider according to a request from a third base station or a third mobile communication provider, the method being performed by the first base station 10, will be described below.

Figure 21:
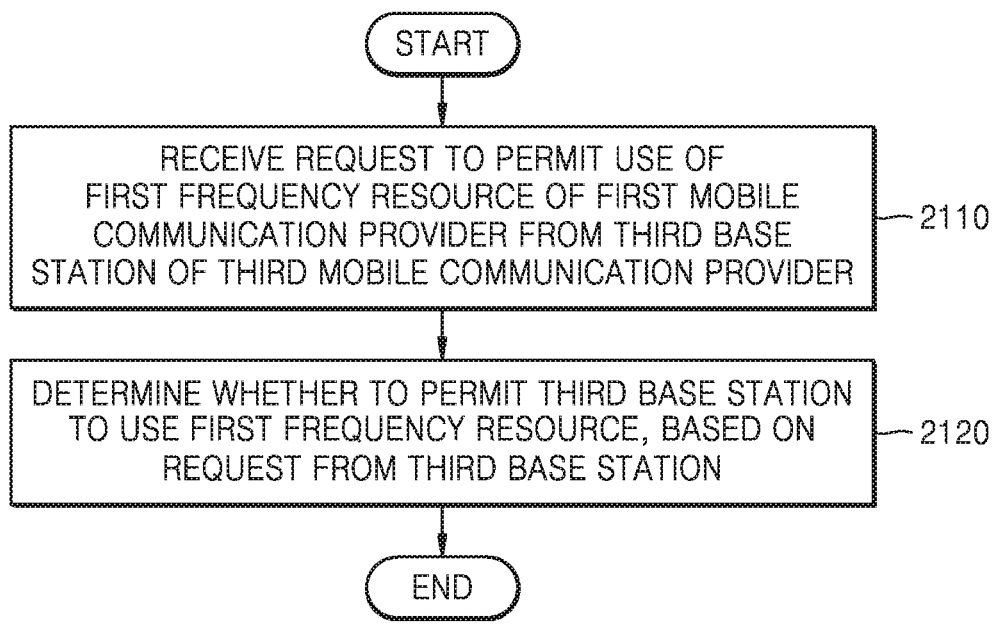
FIG. 21 is a diagram illustrating a method of sharing a frequency resource of a first base station with a third base station, the method being performed by the first base station according to an embodiment of the disclosure.

FIG. 21 is a diagram illustrating a method of sharing a frequency resource of a first base station with a third base station, the method being performed by the first base station according to an embodiment of the disclosure.

Referring to FIG. 21, in operation 2110, the first base station may receive a request to permit use of a first frequency resource of a first mobile communication provider from a third base station of a third mobile communication provider.

In an embodiment of the disclosure, the first base station may perform an operation related to a second base station described above with reference to FIGS. 6 to 20. That is, details of the operation of the first base station in operation 2110 may correspond to those of the operation of the second base station in operation 710 of FIG. 7 and thus are not redundantly described here.

In an embodiment of the disclosure, the first base station may receive a request to permit use of the first frequency resource not only from the third base station but also from a server of a third mobile communication provider or a base station other than the third base station.

In operation 2120, the first base station may determine whether to permit the third base station to use the first frequency resource, based on the request from the third base station. Details of the operation of the first base station in operation 2120 may correspond to those of the operation of the second base station in operation 1103 of FIG. 11 and thus are not redundantly described here. That is, the first base station may determine whether to permit the third base station to use the first frequency resource, based on an occupancy state of the first frequency resource.

In one embodiment of the disclosure, the first base station may transmit a response to the request from the third base station. Alternatively, the first base station may allocate time and frequency resources for the third base station to communicate with a UE subscribed to the third mobile communication provider through the first frequency resource. Operations of the second base station corresponding to the first base station described above with reference to FIGS. 6 to 20 may be inferred and applied to operations of the first base station corresponding to the third base station.

Figure 22:
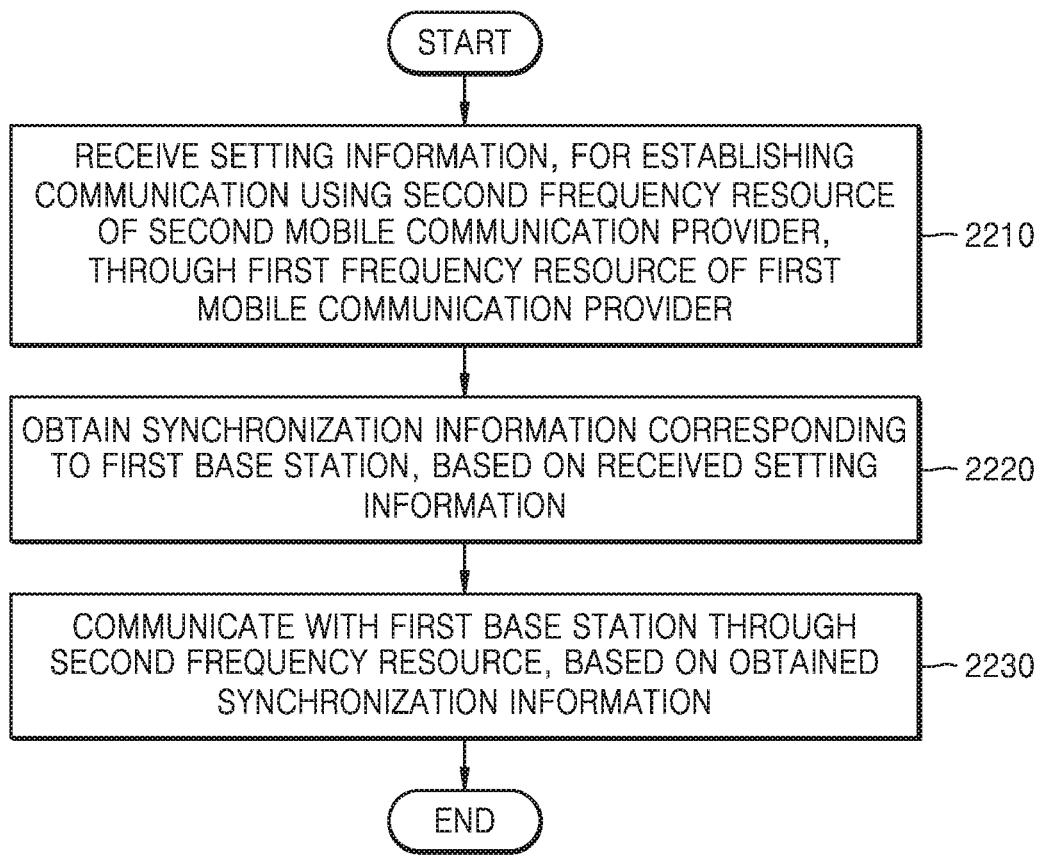
FIG. 22 is a flowchart of a method of communicating with a first base station of a first mobile communication provider by using a frequency resource of a second mobile communication provider, the method being performed by a UE according to an embodiment of the disclosure.

FIG. 22 is a flowchart of a method of communicating with a first base station of a first mobile communication provider by using a frequency resource of a second mobile communication provider, the method being performed by a UE according to an embodiment of the disclosure.

Referring to FIG. 22, in operation 2210, the UE may receive setting information, for establishing communication using a second frequency resource of the second mobile communication provider, through a first frequency resource of the first mobile communication provider. For example, the UE may receive the setting information, for establishing communication using the second frequency resource, from the first base station of the first mobile communication provider. The setting information and a method of receiving the setting information by the UE have been described above with reference to FIGS. 6 to 20 and thus a description thereof is omitted.

In operation 2220, the UE may obtain synchronization information corresponding to the first base station, based on the received setting information. For example, the UE may obtain the synchronization information of the first base station in the second frequency resource, based on a method of obtaining synchronization information, the method being included in the setting information. The method of obtaining the synchronization information by the UE has been described above with reference to FIGS. 6 to 20 and thus a description thereof is omitted.

In operation 2230, the UE may communicate with the first base station through the second frequency resource, based on the obtained synchronization information. The UE may transmit control information or data to or receive control information or data from the first base station through the second frequency resource, based on the synchronization information and the setting information. The UE may receive a second synchronization signal of the second base station, and communicate with the first base station, based on the second synchronization signal. In addition, the UE may perform rate matching on a signal received through the second frequency resource, based on at least one of the setting information or the second synchronization signal.

Figure 23:
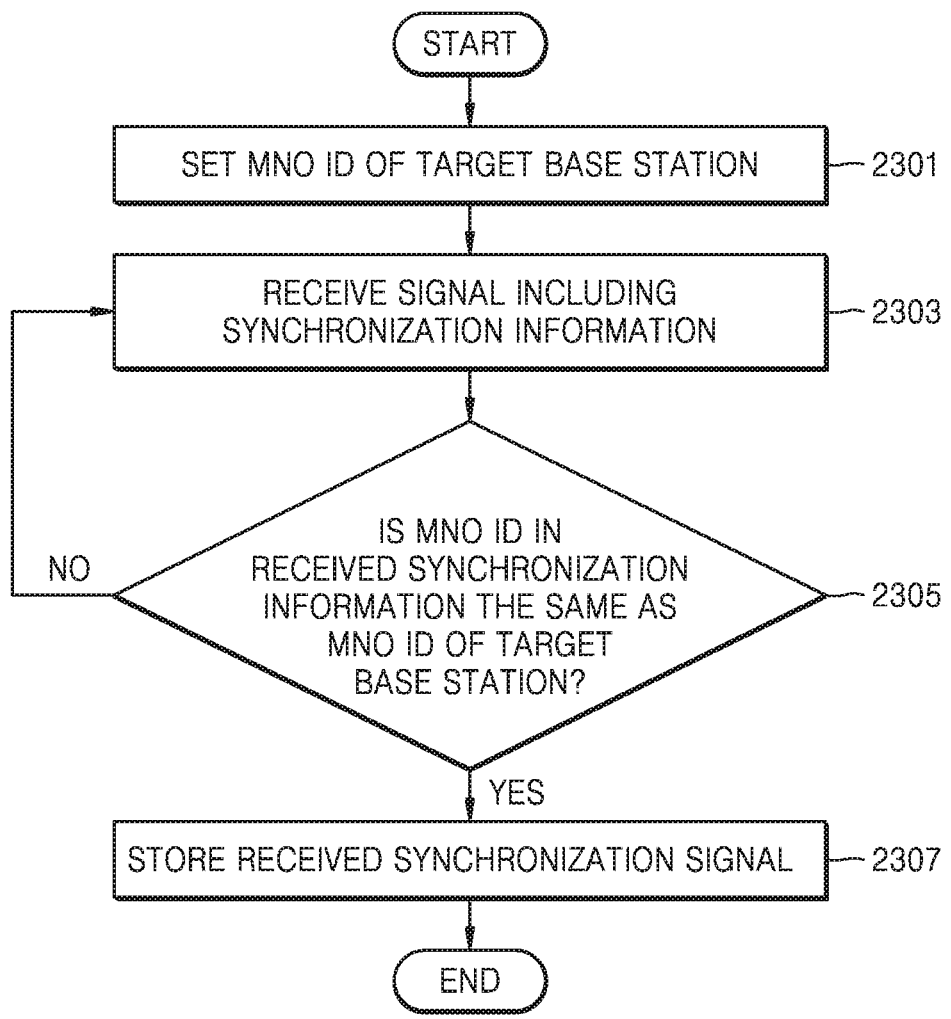
FIG. 23 is a diagram illustrating a method of storing synchronization information of a target base station by identifying identification information of a mobile communication provider, which is included in the synchronization information, the method being performed by a UE according to an embodiment of the disclosure.

FIG. 23 is a diagram illustrating a method of storing synchronization information of a target base station by identifying identification information of a mobile communication provider, which is included in the synchronization information, the method being performed by a UE according to an embodiment of the disclosure.

Referring to FIG. 23, in operation 2301, the UE may set an MNO ID of the target base station. The MNO ID may refer to identification information of a mobile communication provider that provides a communication service to which the UE is subscribed. The target base station may include one or more base stations.

In operation 2303, the UE may receive a signal including synchronization information. The signal including the synchronization information may include at least one of a periodic synchronization signal or an aperiodic preamble. The signal including the synchronization information may include an MNO ID of a mobile communication provider that controls a base station that transmitted the signal.

In operation 2305, the UE may determine whether the MNO ID in the received synchronization information is the same as the MNO ID of the target base station.

When the MNO ID in the received synchronization information is not the same as the MNO ID of the target base station, the UE may return to operation 2303 and attempt to receive a signal including synchronization information.

When the MNO ID in the received synchronization information is the same as the MNO ID of the target base station, in operation 2307, the UE may store the received synchronization information. The UE may determine that the base station that transmits the synchronization information is the target base station. The UE may communicate with the target base station, based on the stored synchronization information.

Figure 24:
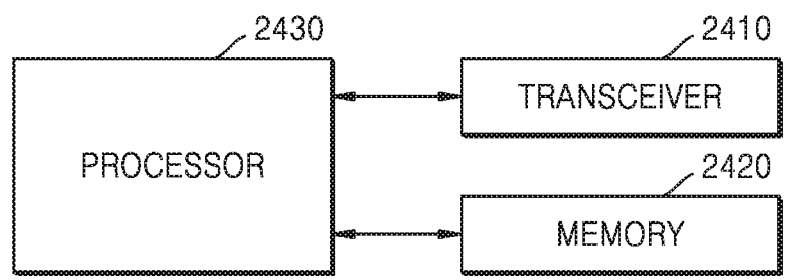
FIG. 24 is a block diagram illustrating a configuration of a base station according to an embodiment of the disclosure.

FIG. 24 is a block diagram illustrating a configuration of a base station according to an embodiment of the disclosure.

A configuration of a base station as described above with reference to FIGS. 1 to 23 may correspond to that of the base station of FIG. 24. For example, the configuration of each of the first base station 10, the second base station 20, and the third base station may correspond to that of the base station of FIG. 24.

Referring to FIG. 24, the base station may include a transceiver 2410, a memory 2420, and a processor 2430. The transceiver 2410, the memory 2420, and the processor 2430 of the base station may operate according to a communication method of a base station as described above. However, components of the base station are not limited to the above-described examples. For example, the base station may include more components or fewer components than the components described above. In addition, the transceiver 2410, the memory 2420, and the processor 2430 may be embodied as one chip. The processor 2430 may include one or more processors.

The transceiver 2410 may transmit a signal to and receive a signal from a UE and other base stations. Here, the signal may include control information and data. To this end, the transceiver 2410 may include a radio-frequency (RF) transmitter that up-converts and amplifies a frequency of a signal to be transmitted, an RF receiver that low-noise amplifies a received signal and down-converts a frequency of the signal, and the like. However, the above description is merely intended to provide an embodiment of the transceiver 2410, and components of the transceiver 2410 are not limited to the RF transmitter and the RF receiver.

In addition, the transceiver 2410 may receive a signal through a wireless channel, output the signal to the processor 2430, and transmit a signal output from the processor 2430 through the wireless channel.

The memory 2420 may store programs and data necessary to operate the base station. In addition, the memory 2420 may store control information or data included in a signal obtained by the base station. The memory 2420 may include a storage medium, such as a ROM, a RAM, a hard disk, a CD-ROM, and a DVD, or a combination of such storage media.

The processor 2430 may control a series of processes to operate the base station according to the above-described embodiments of the disclosure. In an embodiment of the disclosure, the processor 2430 may control to: perform scheduling to allocate a time-domain resource for a data channel, and transmit, to a UE, control information regarding the allocation of the time-domain resource allocation for the data channel.

In an embodiment of the disclosure, the processor 2430 may control to: request to permit a first base station to use a second frequency resource of a second mobile communication provider; transmit setting information, for setting communication using a second frequency resource of a second mobile communication provider, to the UE through a first frequency resource of a first mobile communication provider; and communicate with the UE through the second frequency resource, based on the setting information.

In an embodiment of the disclosure, the processor 2430 may control to: receive a response to the request to permit use of the second frequency resource and transmit the setting information, based on the received response.

In an embodiment of the disclosure, when a NACK is not received with respect to the request, the processor 2430 may determine that the request is permitted.

In an embodiment of the disclosure, the setting information may include information about a method for a UE to obtain synchronization information corresponding to a first base station, and the synchronization information may be obtained through at least one of a periodic synchronization signal or an aperiodic preamble and include identification information of a first mobile communication provider.

In an embodiment of the disclosure, the identification information may be uniquely predetermined for the first mobile communication provider to distinguish between a plurality of mobile communication providers or may be allocated to the first base station from the second base station of the second mobile communication provider, and the processor 2430 may control to transmit the identification information of the first mobile communication provider to the UE.

In an embodiment of the disclosure, the processor 2430 may control the first base station to: request the second base station of the second mobile communication provider to allocate time and frequency resources for communication with the UE through the second frequency resource, be allocated the time and frequency resources from the second base station, transmit a periodic synchronization signal or an aperiodic preamble to the UE by using the allocated time and frequency resources, and communicate with the UE, based on synchronization information included in the periodic synchronization signal or the aperiodic preamble.

In an embodiment of the disclosure, the setting information may include information about a method of obtaining synchronization information corresponding to the first base station by the UE, and the synchronization information may be obtained based on a first synchronization signal corresponding to the first base station transmitted through a first frequency resource or a second synchronization signal corresponding to the second base station of the second mobile communication provider transmitted through the second frequency resource.

In an embodiment of the disclosure, the information about the method of obtaining synchronization information may include the first or second synchronization signal and information about an offset between pieces of synchronization information for communication of the UE with the first base station through the second frequency resource.

In an embodiment of the disclosure, the processor 2430 may control to: obtain information about the second synchronization signal corresponding to the second base station of the second mobile communication provider, determine a region in which rate matching is to be performed when the UE receives data from the first base station, based on the second synchronization signal, and transmit information about the region in which rate matching is to be performed to the UE, and the information about the second synchronization signal may include about transmission timing of the second synchronization signal and information about a transmission period of the second synchronization signal.

In an embodiment of the disclosure, the processor 2430 may receive a request to permit use of a first frequency resource of the first mobile communication provider from a third base station of a third mobile communication provider, and determine whether to permit the third base station to use the first frequency resource, based on the request.

Figure 25:
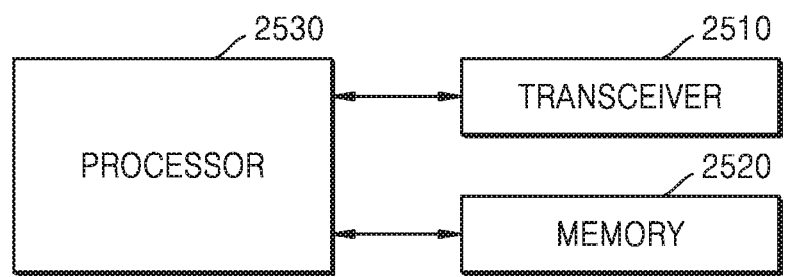
FIG. 25 is a block diagram illustrating a configuration of a UE according to an embodiment of the disclosure.

FIG. 25 is a block diagram illustrating a configuration of a UE according to an embodiment of the disclosure.

Referring to FIG. 25, the UE may include a transceiver 2510, a memory 2520, and a processor 2530. The transceiver 2510, the memory 2520, and the processor 2530 of the UE may operate according to a communication method of a UE as described above. However, components of the UE are not limited to the above-described examples. For example, the UE may include more components or fewer components than the components described above. Alternatively, the transceiver 2510, the memory 2520, and the processor 2530 may be embodied as one chip. The processor 52430 may include one or more processors.

The transceiver 2510 may transmit a signal to and receive a signal from a base station. Here, the signal may include control information and data. To this end, the transceiver 2510 may include an RF transmitter that up-converts and amplifies a frequency of a signal to be transmitted, an RF receiver that low-noise amplifies a received signal and down-converts a frequency of the signal, and the like. However, the above description is merely intended to provide an embodiment of the transceiver 2510, and components of the transceiver 2510 are not limited to the RF transmitter and the RF receiver.

In addition, the transceiver 2510 may receive a signal through a wireless channel, output the signal to the processor 2530, and transmit a signal output from the processor 2530 through the wireless channel.

The memory 2520 may store programs and data necessary to operate the UE. In addition, the memory 2420 may store control information or data included in a signal obtained by the UE. The memory 2520 may include a storage medium, such as a ROM, a RAM, a hard disk, a CD-ROM, and a DVD, or a combination of such storage media.

The processor 2530 may control a series of processes to operate the UE base station according to the above-described embodiments of the disclosure. In an embodiment of the disclosure, the processor 2530 may control to: receive, from a base station, control information regarding allocation of a time-domain resource for a data channel, and determine the allocation of the time-domain resource to the data channel, based on the received control information.

In an embodiment of the disclosure, the processor 2530 may control to: receive setting information, for setting communication using a second frequency resource of a second mobile communication provider, through a first frequency resource of a first mobile communication provider, obtain synchronization information corresponding to a first base station, based on the received setting information, and communicate with the first base station through the second frequency resource, based on the obtained synchronization information. The setting information may include information about a method of obtaining synchronization information, and the synchronization information may include identification information of the first mobile communication provider.

The methods according to the embodiments of the disclosure described in the claims or specification of the disclosure may be implemented by hardware, software, or a combination of hardware and software.

When the methods are implemented by software, a non-transitory, semi-transitory, or transitory computer-readable storage medium storing one or more programs (software modules) may be provided. The one or more programs stored in the non-transitory computer-readable storage medium are configured to be executable by one or more processors included in an electronic device. The one or more programs include instructions that cause an electronic device to execute the methods according to the embodiments set forth in the claims or specification of the disclosure.

Such programs (software modules or software) may be stored in a random access memory, a non-volatile memory, such as flash memory, a read-only memory (ROM), an electrically erasable programmable ROM (EEPROM), a magnetic disc storage device, a compact disc-ROM (CD-ROM), a digital versatile disc (DVD), other types of optical storage devices, or a magnetic cassette. Otherwise, such programs may be stored in a memory which is a combination of some or all the above storage media. Alternatively, a plurality of such memories may be provided.

The programs may be stored in an attachable storage device accessible via communication networks, such as the Internet, an Intranet, a local area network (LAN), a wide LAN (WLAN) or a storage area network (SAN) or a combination thereof. Such a storage device may be connected to a device performing embodiments of the disclosure through an external port. Otherwise, a separate storage device in a communication network may be connected to a device that performs embodiments of the disclosure.

In the embodiments of the disclosure described above, each component included in the disclosure is expressed in a singular or plural form according to a presented embodiment. However, singular or plural expressions are appropriately selected according to a situation described for convenience of description and the disclosure is not limited by singular or plural components. Even components expressed in a plural form may be embodied in a singular form or even components expressed in a singular form may be embodied in a plural form.

The embodiments of the disclosure set forth in the present specification and drawings are merely intended to provide examples to easily explain the technical matters of the disclosure and help understanding of the disclosure, and are not intended to limit the scope of the disclosure. That is, it will be obvious to those of ordinary skill in the art that other modified examples based on the technical spirit of the disclosure can be implemented. These embodiments can be implemented in combination as necessary. For example, a base station and a UE may be operated according to a combination of part of an embodiment of the disclosure and part of another embodiment of the disclosure. In addition, embodiments of the disclosure are applicable to other communication systems and other modifications based on the technical spirit of the embodiments may also be implemented.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of communicating with a user equipment by using a frequency resource of a second mobile communication provider in a mobile communication system, the method being performed by a first base station of a first mobile communication provider, the method comprising:
   requesting to permit the first base station to use a second frequency resource of the second mobile communication provider;
   transmitting, to the user equipment, setting information, for establishing communication using the second frequency resource of the second mobile communication provider, through a first frequency resource of the first mobile communication provider; and
   communicating with the user equipment through the second frequency resource, based on the setting information,
   wherein the setting information comprises information about a method of obtaining, by the user equipment, synchronization information corresponding to the first base station, and
   wherein the synchronization information is obtained through at least one of a periodic synchronization signal or an aperiodic preamble and comprises identification information of the first mobile communication provider.

2. The method of claim 1, further comprising:
receiving a response to the request for the permission,
wherein the transmitting of the setting information comprises transmitting the setting information, based on the received response.

3. The method of claim 1, further comprising, unless a negative acknowledgment (NACK) is received with respect to the request for the permission, determining that the request is permitted.

4. The method of claim 1,
wherein the identification information is uniquely predetermined for the first mobile communication provider to distinguish between a plurality of mobile communication providers or is allocated to the first base station from a second base station of the second mobile communication provider, and
wherein the method further comprises transmitting the identification information of the first mobile communication provider to the user equipment.

5. The method of claim 1, further comprising:
requesting a second base station of the second mobile communication provider to allocate time and frequency resources to the first base station for communication with the user equipment by using the second frequency resource;
receiving allocation of the time and frequency resources from the second base station; and
transmitting the periodic synchronization signal or the aperiodic preamble to the user equipment by using the allocated time and frequency resources,
wherein the communicating with the user equipment comprises communicating with the user equipment, based on the synchronization information included in the periodic synchronization signal or the aperiodic preamble.

6. The method of claim 1,
wherein the setting information comprises information about a method of obtaining, by the user equipment, synchronization information corresponding to the first base station,
wherein the synchronization information is obtained based on a first synchronization signal transmitted through the first frequency resource or a second synchronization signal transmitted through the second frequency resource, and
wherein the first synchronization signal corresponds to the first base station and the second synchronization signal corresponds to a second base station of the second mobile communication provider.

7. The method of claim 6, wherein the information about the method of obtaining the synchronization information comprises information about an offset between the first or second synchronization signal and the synchronization information for communicating the user equipment with the first base station through the second frequency resource.

8. The method of claim 1, further comprising:
obtaining information about a second synchronization signal corresponding to a second base station of the second mobile communication provider;
determining a region in which rate matching is to be performed when the user equipment receives data from the first base station, based on the information about the second synchronization signal; and
transmitting, to the user equipment, information about the region in which rate matching is to be performed,
wherein the information about the second synchronization signal comprises information about transmission timing of the second synchronization signal and information about a transmission period of the second synchronization signal.

9. The method of claim 1, further comprising:
receiving a request to permit use of the first frequency resource of the first mobile communication provider from a third base station of a third mobile communication provider; and
determining whether to permit the third base station to use the first frequency resource, based on the request from the third base station.

10. A method of communicating with a first base station of a first mobile communication provider by using a frequency resource of a second mobile communication provider in a wireless communication system, the method being performed by a user equipment, the method comprising:
receiving setting information, for establishing communication using a second frequency resource of the second mobile communication provider, through a first frequency resource of the first mobile communication provider;
obtaining synchronization information corresponding to the first base station, based on the received setting information; and
communicating with the first base station through the second frequency resource, based on the obtained synchronization information,
wherein the setting information comprises information about a method of obtaining the synchronization information, and
wherein the synchronization information comprises identification information of the first mobile communication provider.

11. A first base station of a first mobile communication provider, which communicates with a user equipment by using a frequency resource of a second mobile communication provider in a wireless communication, the first base station comprising:
a transceiver;
a memory; and
at least one processor configured to control to:
request to permit the first base station to use a second frequency resource of the second mobile communication provider,
transmit setting information, for establishing communication through the second frequency resource of the second mobile communication provider, to the user equipment by using a first frequency resource of the first mobile communication provider, and
communicate with the user equipment through the second frequency resource, based on the setting information,
wherein the setting information comprises information about a method of obtaining, by the user equipment, synchronization information corresponding to the first base station, and
wherein the synchronization information is obtained through at least one of a periodic synchronization signal or an aperiodic preamble and comprises identification information of the first mobile communication provider.

12. The first base station of claim 11, wherein the at least one processor is further configured to control to:

receive a response to the request for the permission, and transmit the setting information, based on the received response.

13. The first base station of claim 11, wherein the at least one processor is further configured to determine that the request for the permission is permitted unless a negative acknowledgment (NACK) is received with respect to the request for the permission.

14. The first base station of claim 11, wherein the at least one processor is further configured to control to:
    request a second base station of the second mobile communication provider to allocate time and frequency resources to the first base station to communicate with the user equipment by using the second frequency resource,
    receive allocation of the time and frequency resources from the second base station,
    transmit the periodic synchronization signal or the aperiodic preamble to the user equipment by using the time and frequency resources, and
    communicate with the user equipment, based on the synchronization information included in the periodic synchronization signal or the aperiodic preamble.

15. The first base station of claim 11,
    wherein the synchronization information is obtained based on a first synchronization signal transmitted through the first frequency resource or a second synchronization signal transmitted through the second frequency resource, and
    wherein the first synchronization signal corresponds to the first base station and the second synchronization signal corresponds to a second base station of the second mobile communication provider.

16. The first base station of claim 15, wherein the information about the method of obtaining the synchronization information comprises information about an offset between the first or second synchronization signal and the synchronization information for communicating the user equipment with the first base station through the second frequency resource.

17. The first base station of claim 11, wherein the at least one processor is further configured to:
    receive a request to permit use of the first frequency resource of the first mobile communication provider from a third base station of a third mobile communication provider, and
    determine whether to permit the third base station to use the first frequency resource, based on the request from the third base station.

18. A user equipment for communicating with a first base station of a first mobile communication provider by using a second frequency resource of a second mobile communication provider in a wireless communication system, the user equipment comprising:
    a transceiver;
    a memory; and
    at least one processor configured to control to:
        receive setting information, for establishing communication using the second frequency resource of the second mobile communication provider, through a first frequency resource of the first mobile communication provider,
        obtain synchronization information corresponding to the first base station, based on the received setting information, and
        communicate with the first base station through the second frequency resource, based on the obtained synchronization information,
    wherein the setting information comprises information about a method of obtaining the synchronization information, and
    wherein the synchronization information comprises identification information of the first mobile communication provider.

* * * * *